(12) United States Patent
Fish

(10) Patent No.: US 7,165,119 B2
(45) Date of Patent: Jan. 16, 2007

(54) SEARCH ENHANCEMENT SYSTEM AND METHOD HAVING RANKINGS, EXPLICITLY SPECIFIED BY THE USER, BASED UPON APPLICABILITY AND VALIDITY OF SEARCH PARAMETERS IN REGARD TO A SUBJECT MATTER

(75) Inventor: Edmund J. Fish, Dulles, VA (US)

(73) Assignee: America Online, Inc., Dulles, VA (US)

( * ) Notice: Subject to any disclaimer, the term of this patent is extended or adjusted under 35 U.S.C. 154(b) by 280 days.

(21) Appl. No.: 10/685,749

(22) Filed: Oct. 14, 2003

(65) Prior Publication Data

US 2005/0097188 A1    May 5, 2005

(51) Int. Cl.
   *G06F 15/16* (2006.01)
(52) U.S. Cl. .................. 709/246; 709/203; 709/219; 709/228
(58) Field of Classification Search .......... 709/203, 709/218, 219, 225; 707/3, 225
   See application file for complete search history.

(56) References Cited

U.S. PATENT DOCUMENTS

| | | | |
|---|---|---|---|
| 5,642,502 A | 6/1997 | Driscoll | 395/606 |
| 5,848,396 A | 12/1998 | Gerace | 705/10 |
| 5,862,325 A | 1/1999 | Reed et al. | 395/200.31 |
| 5,974,412 A | 10/1999 | Hazlehurst et al. | 707/3 |
| 5,983,214 A | 11/1999 | Lang et al. | 707/1 |
| 6,018,738 A | 1/2000 | Breese et al. | 700/100 |
| 6,029,161 A | 2/2000 | Lang et al. | 707/1 |
| 6,029,195 A | 2/2000 | Herz | 709/219 |
| 6,047,327 A | 4/2000 | Tso et al. | 709/232 |
| 6,144,964 A | 11/2000 | Breese et al. | 707/10 |
| 6,182,068 B1 | 1/2001 | Culliss | 707/5 |
| 6,256,639 B1 * | 7/2001 | Himmel et al. | 709/219 |

(Continued)

FOREIGN PATENT DOCUMENTS

EP    1 072 982    1/2001

(Continued)

OTHER PUBLICATIONS

Pitkow, J. et al.; *Personalized Search;* Communications of the ACM, vol. 45, No. 9, p. 50-5; Sep. 2002.

(Continued)

*Primary Examiner*—Rupal Dharia
*Assistant Examiner*—Quang N. Nguyen
(74) *Attorney, Agent, or Firm*—Michael A. Glenn; Glenn Patent Group

(57) ABSTRACT

The system and method comprises enhancement of results for a search engine, wherein the results from the search engine are refined or reorganized, based upon information from an identified secondary source. The results obtained using a conventional search are compared against the identified secondary source, e.g. a ratings service, and are filtered and/or sorted appropriately. In some embodiments, identification of the secondary source, such as a ratings service comprising information which may supplement the subject of a search query, is based upon information entered by the user. In alternate embodiments, the secondary source is associated with a user, as part of general user-specified search parameters, wherein one or more parameters are consulted automatically for searches for appropriate subject matter.

51 Claims, 15 Drawing Sheets

U.S. PATENT DOCUMENTS

| | | | |
|---|---|---|---|
| 6,256,664 B1 | 7/2001 | Donoho et al. | 709/204 |
| 6,263,362 B1 | 7/2001 | Donoho et al. | 709/207 |
| 6,289,353 B1 | 9/2001 | Hazlehurst et al. | 707/102 |
| 6,308,175 B1 | 10/2001 | Lang et al. | 707/10 |
| 6,314,420 B1 | 11/2001 | Lang et al. | 707/3 |
| 6,314,423 B1* | 11/2001 | Himmel et al. | 709/218 |
| 6,324,566 B1* | 11/2001 | Himmel et al. | 709/203 |
| 6,345,264 B1 | 2/2002 | Breese et al. | 706/21 |
| 6,345,288 B1 | 2/2002 | Reed et al. | 709/201 |
| 6,349,307 B1 | 2/2002 | Chen | 707/103 |
| 6,353,813 B1 | 3/2002 | Breese et al. | 706/12 |
| 6,356,936 B1 | 3/2002 | Donoho et al. | 706/206 |
| 6,360,215 B1 | 3/2002 | Judd et al. | 707/3 |
| 6,363,377 B1 | 3/2002 | Kravets et al. | 707/4 |
| 6,377,945 B1 | 4/2002 | Risvik | 707/3 |
| 6,397,212 B1 | 5/2002 | Biffar | 707/5 |
| 6,404,884 B1 | 6/2002 | Marwell et al. | 379/265.13 |
| 6,453,315 B1 | 9/2002 | Weissman et al. | 707/5 |
| 6,466,970 B1 | 10/2002 | Lee et al. | 709/217 |
| 6,480,853 B1* | 11/2002 | Jain | 709/225 |
| 6,484,162 B1 | 11/2002 | Edlund et al. | 707/3 |
| 6,493,637 B1 | 12/2002 | Steeg | 702/19 |
| 6,498,795 B1 | 12/2002 | Zhang et al. | 370/400 |
| 6,505,194 B1 | 1/2003 | Nicolovska et al. | 707/3 |
| 6,510,458 B1 | 1/2003 | Berstis et al. | 709/219 |
| 6,539,377 B1 | 3/2003 | Culliss | 707/5 |
| 6,539,392 B1 | 3/2003 | Rebane | 707/101 |
| 6,550,057 B1 | 4/2003 | Bowman-Amuah | 717/126 |
| 2002/0059204 A1* | 5/2002 | Harris | 707/3 |
| 2005/0028156 A1* | 2/2005 | Hammond et al. | 718/100 |
| 2005/0071328 A1* | 3/2005 | Lawrence | 707/3 |

FOREIGN PATENT DOCUMENTS

| | | |
|---|---|---|
| EP | 1 095 326 | 1/2002 |
| EP | 1 284 461 | 2/2003 |
| EP | 1 288 795 | 3/2003 |

OTHER PUBLICATIONS

McGowan, J.P. et al.; *Who Do You Want To Be Today? Web Personae for Personalised Information Access;* Adaptive Hypermedia and Adaptive Web-Based Systems. Second International Conference, AH 2002. Proceedings (Lecture Notes in Computer Science vol. 2347), p. 514-17; 2002.

Kalajdziski, S. et al.; *Intelligent Recommendation in Digital Library;* Proceedings of the IASTED International Conference Intelligent Systems and Control, p. 408-12; ACTA Press, Anaheim, CA, USA; 2001.

Kerschberg, L. et al.; *A Semantic Taxonomy-Based Personalizable Meta-Search Agent;* Proceedings of the Second International Conference on Web Information Systems Engineering, vol. 1, p. 41-50; IEEE Comput. Soc., Los Alamitos, CA, USA; 2002.

Dichev, C.; *A Framework for Context-Driven Web Resource Discovery;* Modeling and Using Context. Third International and Interdisciplinary Conference, Context 2001, Proceedings (Lecture Notes in Artificial Intelligence, vol. 2116), p. 433-6; Springer-Verlag, Berlin, Germany; 2001.

Meng, X. et al.; *Feasibility of Adding Filtering Process in Web Browser to Improve Web Search Accuracy;* Proceedings of the International Conference on Parallel and Distributed Processing Techniques and Applications, PDPTA 2000, vol. 4, p. 1809-15; CSREA Press, Athens, GA, USA; 2000.

Kim, K. et al.; *Development of a Personalized Link-Based Search Engine Using Fuzzy Concept Network;* Journal of KISS: Computing Practices, vol. 7, No. 3, p. 211-19; Korea Inf. Sci. Soc.; Jun. 2001.

Yang, C. et al.; *A Hybrid Document Clustering for a Web Agent;* Journal of KISS: Software and Applications, vol. 28, No. 5, p. 422-30; Korea Inf. Sci. Soc., May 2001.

Kim, K. et al.; *A Personalized Web Search Engine Using Fuzzy Concept Network with Link Structure;* Proceedings Joint 9th IFSA World Congress and 20th NAFIPS International Conference (Cat. No. 01TH8569), vol. 1, p. 81-6; IEEE, Piscataway, NJ, USA; 2001.

Scime, A. et al.; *WebSifter: An Ontology-Based Personalizable Search Agent for the Web;* Proceedings 2000 Kyoto International Conference on Digital Libraries: Research and Practice, p. 203-10; IEEE Comput. Soc., Los Alamitos, CA, USA; 2000.

Wei-Feng, Z. et al.; *Personalizing Search Result Using Agent;* Mini-Micro Systems, vol. 22, No. 6, p. 724-7; Mini-Micro Syst., China; Jun. 2001.

Chen, P. et al.; *An Information Retrieval System Based on a User Profile;* Journal of Systems and Software, vol. 54, No. 1, p. 3-8; Elsevier; Sep. 30, 2000.

Meng, X. et al.; *Personalized Web Search Using Information On Client's Side;* Fifth International Conference for Young Computer Scientists, ICYCS'99, Advances in Computer Science and Technology, vol. 2, p. 985-92; Int. Acad. Publishers, Beijing, China; 1999.

Chen, P. et al.; *A Personalized Information Retrieval System;* Computational Intelligence for Modelling, Control and Automation, Intelligent Image Processing, Data Analysis and Information Retrieval (Concurrent Systems Engineering Series, vol. 56), p. 247-53; IOS Press, Amsterdam, Netherlands; 1999.

Laine-Cruzel, S. et al.; *Improving Information Retrieval by Combining User Profile and Document Segmentation;* Information Processing & Management, vol. 32, No. 3, p. 305-15; Elsevier; May 1996.

Boley, D. et al.; *Document Categorization and Query Generation on the World Wide Web Using WebACE;* Department of Computer Science and Engineering, University of Minnesota.

Pretschner, A.; *Ontology Based Personalized Search;* Dipl.-Inform., RWTH Aachen, Germany, 1998.

Callan, J. et al.; *Document Filtering with Inference Networks;* Computer Science Department, University of Massachusetts.

Goker, A.; *Capturing Information Need by Learning User Context;* School of Computer and Mathematical Sciences; The Robert Gordon University.

Chen, L. et al.; *WebMate: A Personal Agent for Browsing and Searching;* The Robotics Institute, Carnegie Mellon Institute; Sep. 30, 1997.

Cooley, R. et al.; *Web Mining: Information and Pattern Discovery on the World Wide Web;* Department of Computer Science and Engineering, University of Minnesota.

Simons, J.; *Using a Semantic User Model to Filter the World Wide Web Proactively;* Nijmegen Institute for Cognition and Information, University of Nijmegen, The Netherlands.

Tanudjaja, F. et al.; *Persona: A Contextualized and Personalized Web Search;* Laboratory of Computer Science at MIT, Cambridge, MA; Jun. 1, 2001.

Yan, T. et al.; *SIFT—A Tool for Wide-Area Information Dissemination;* Department of Computer Science, Stanford University, Feb. 16, 1995.

Bianchi-Berthouze, N.; *Mining Multimedia Subjective Feedback;* Journal of Intelligent Information Systems: Integrating Artificial Intelligence and Database Technologies, vol. 19, No. 1, p. 43-59; Kluwer Academic Publishers; Jul. 2002.

Widyantoro, D.H. et al.; *A fuzzy Ontology-Based Abstract Search Engine and Its User Studies;* 10th IEEE International Conference on Fuzzy Systems. (Cat. No. 01CH37297), vol. 2, p. 1291-4; IEEE, Piscataway, NJ, USA; 2001.

Widyantoro, D.H. et al.; *Using Fuzzy Ontology for Query Refinement in a Personalized Abstract Search Engine;* Proceedings Joint 9th IFSA World Congress and 20th NAFIPS International Conference (Cat. No. 01TH8569), vol. 1, p. 610-15; IEEE, Piscataway, NJ, USA; 2001.

Ho, M. et al.; *A GA-Based Dynamic Personalized Filtering for Internet Search Service on Multi-Search Engine;* Canadian Conference on Electrical and Computer Engineering 2001, Conference Proceedings (Cat. No.01TH8555) vol. 1, p. 271-6; IEEE , Piscataway, NJ, USA; 2001.

Pogaenik, M. et al.; *Layered Agent System Architecture for Personalized Retrieval of Information from Internet;* Signal Processing X Theories and Applications. Proceedings of EUSIPCO 2000. Tenth European Signal Processing Conference, vol. 1, p. 421-4; Tampere Univ. Technology, Tampere, Finland; 2000.

Ho, M. et al.; *An Agent-Based Personalized Search on a Multi-Search Engine Based on Internet Search Service;* Intelligent Data Engineering and Automated—IDEAL 2000, Data Mining, Financial Engineering, and Intelligent Agents, Second International Conference, Proceedings (Lecture Notes in Computer Science vol. 1983), p. 404-9; Springer-Verlag, Berlin, Germany; 2000.

Overmeer, M.A.C.J.; *My Personal Search Engine;* Computer Networks, vol. 31, No. 21, p. 2271-9; Elsevier, Nov. 10, 1999.

Lee, E.S. et al.; *Agent-Based Support for Personalized Information with Web Search Engines;* Design of Computing Systems: Cognitive Considerations. Proceedings of the Seventh International Conference on Human-Computer Interaction (HCI International '97), vol. 2, p. 783-6; Elsevier, Amsterdam, Netherlands; 1997.

Berger, F.C. et al.; *Personalized Search Support for Networked Document Retrieval Using Link Inference;* Database and Expert Systems Applications. 7th International Conference, DEXA '96 Proceedings, p. 802-11; Springer-Verlag, Berlin, Germany; 1996.

Freund, Y. et al.; *An Efficient Boosting Algorithm for Combining Preferences;* AT&T Labs, MIT Laboratory for Computer Science.

Shavlik, J. et al.; *Building Intelligent Agents for Web-Based Tasks: A Theory-Refinement Approach;* University of Wisconsin-Madison.

Shavlik, J. et al.; *Intelligent Agents for Web-based Tasks: An Advice-Taking Approach;* University of Wisconsin-Madison.

Baudisch, P.; *The Profile Editor; Designing a Direct Manipulative Tool for Assembling Profiles;* Institute for Integrated Information and Publication Systems ISPI, German National Research Center for Information Technology GMD, Germany.

Budzik, J. et al.; *User Interactions with Everyday Applications as Context for Just-in-time Information Access;* Intelligent Information Laboratory, Northwestern University.

Budzik, J. et al.; *Watson: Anticipating and Contextualizing Information Needs;* Northwestern University.

Glover, E.J. et al.; *Improving Category Specific Web Search by Learning Query Modifications;* NEC Research Institute, Princeton, NJ, EECS Department, University of Michigan, Ann Arbor, MI, Information Sciences and Technology, Pennsylvania State University.

Pazzani, M.J. et al.; *A Framework for Collaborative, Content-Based and Demographic Filtering;* Department of Information and Computer Science, University of California, Irvine.

Bauer, T. et al.; *Real Time User Context Modeling for Information Retrieval Agents;* Computer Science Department, Indiana University.

Shavlik, J. et al.; *An Instructable, Adaptive Interface for Discovery and Monitoring Information on the World-Wide Web;* University of Wisconsin-Madison.

Budzik, J. et al.; *Watson: An Infrastructure for Providing Task-Relevant, Just-In-Time Information;* Department of Computer Science, Northwestern University.

Nahl, D.; *Ethnography of Novices' First Use of Web Search Engines; Affective Control in Cognitive Processing* Internet Reference Services Quarterly, vol. 3, No. 2, pp. 51-72; 1998.

\* cited by examiner

SEARCH ENHANCEMENT SYSTEM AND METHOD HAVING RANKINGS, EXPLICITLY SPECIFIED BY THE USER, BASED UPON APPLICABILITY AND VALIDITY OF SEARCH PARAMETERS IN REGARD TO A SUBJECT MATTER

CROSS REFERENCE TO RELATED APPLICATION

This Application is related to Edmund J. Fish, U.S. application Ser. No. 10/685,747, entitled Search Enhancement System with Information from a Selected Source, filed 14 Oct. 2003.

FIELD OF THE INVENTION

The invention relates to the search and retrieval of information or content in a network environment. More particularly, the invention relates to the enhancement of search results, based upon information received from a user and/or an external source.

BACKGROUND OF THE INVENTION

Conventional search engines compare input search terms against metadata, to identify displayable results. Some search processes also allow for refined searching in input terms, against particular identified types of metadata. For example, during a search query at a search engine, a user may be able to enter either a word string, e.g. "serial number", or a corresponding abbreviation, e.g. "SN", to indicate that subsequent search terms should be applied against serial number metadata. Furthermore, some conventional search engines permit comparison of input search terms against full or partial text.

When applying conventional search technology, users typically obtain several pages of search results for any given search query, necessitating an extended period of review. For example, a common problem which is often encountered with conventional search queries is that the found set of matching sites or information sources, or documents is often too large, i.e. too broad, such as if too few search terms are entered within a search string, or if the search terms are too general. A user must often either manually browse through a large number of found sources to find relevant sites, or must perform a different search, typically having different terms and/or additional terms, in the hopes of more accurately finding the desired sites and/or information.

A similar problem that is also encountered with conventional search inquires is that the found set of matching sites, information sources, or documents is often too small, i.e. too narrow, such as if too many search terms are entered within a string, or if the search terms are too narrow in scope. A user is then typically required to perform one or more subsequent searches, typically having different terms and/or fewer terms, in the hopes of finding a larger found set of desired sites and information.

Several structures and methods have been described for the searching and retrieval of information in a network environment.

J. Breese and C. Kadie, Methods and Apparatus for Tuning a Match Between Entities Having Attributes, U.S. Pat. No. 6,144,964, describe a matching of "entities having attributes, some of which have associated values. The values of the attributes may be adjusted based on number of entities that have values for a particular attribute so that the values decrease as the number increases. The attributes of the entities may be harmonized and provided with default values so that entities being matched have common attributes defined by the union of the attributes of the entities being matched. The attributes of the entities may be expanded and provided with default values so that the entities being matched have attributes that neither had originally. Match values may be normalized to provide a weight value which may be used to predict an attribute value of a new entity based on known attribute values of known entities. The weight values may be tuned such that relatively high weights are amplified and relatively low weights are suppressed."

B. Hazlehurst, S. Burke, and K. Nybakken, Intelligent Query System for Automatically Indexing in a Database and Automatically Categorizing Users, U.S. Pat. No. 6,289,353 B1, describe a system which "develops multiple information spaces in which different types of real-world objects (e.g., documents, users, products) can be represented. Machine learning techniques are used to facilitate automated emergence of information spaces in which objects are represented as vectors of real numbers. The system then delivers information to users based upon similarity measures applied to the representation of the objects in these information spaces. The system simultaneously classifies documents, users, products, and other objects. Documents are managed by collators that act as classifiers of overlapping portions of the database of documents. Collators evolve to meet the demands for information delivery expressed by user feedback. Liaisons act on the behalf of users to elicit information from the population of collators. This information is then presented to users upon logging into the system via Internet or another communication channel. Mites handle incoming documents from multiple information sources (e.g., in-house editorial staff, third-party news feeds, large databases, World Wide Web spiders) and feed documents to those collators which provide a good fit for the new documents."

V. Berstis and H. Rodriguez, Blocking Saves to Web Browser Cache Based on Content Rating, U.S. Pat. No. 6,510,458 B1, describe a process in which a "user sets preference parameters that filter web page contents from being stored in the cache. The preferences relate to the web page's contents and attributes. Before caching the web page, the contents and attributes of the web page are filtered solely as a function of the web browser. Cache filters take a variety of forms, such as ratings filters, web page identifier filters, and key word filters, which scan accessed contents of a web page for user selected terms. The filtered web page is then blocked from entry in the browser's cache based on the filtering process. Conversely, a user sets preference parameters that filter web page contents to override the block from cache preferences. The browser responds by storing the filtered web pages that were previously designated as web pages not to be cached."

Other structures and methods for the searching and retrieval of information include: Y. Freund et al., *An Efficient Boosting Algorithm for Combining Preferences*, AT&T Labs, MIT Laboratory for Computer Science; J. Shavilk et al., *Building Intelligent Agents for Web-Based Tasks: A Theory-Refinement Approach*, University of Wisconsin-Madison; and J. Shavlik, et al., *Intelligent Agents for Web-based Tasks: An Advice-Taking Approach*, University of Wisconsin-Madison.

Several other structures and methods provide background information in regard to the search and retrieval of information, such as: European Patent Application No. EP 1 288 795 A1, Query systems; D. Reed, P. Heymann, S. Mushero, K. Jones, J. Oberlander, and D. Banay, Computer-Based Communication System and Method Using Metadata Defining a Control Structure, U.S. Pat. No. 5,862,325; B. Hazlehurst, S. Burke, and K. Nybakken, Intelligent Query System for Automatically Indexing Information in a Database and Automatically Categorizing Users, U.S. Pat. No. 5,974,412; J. Breese and C. Kadie, Methods and Apparatus for Matching Entities and for Predicting an Attribute of an Entity Based on an Attribute Frequency Value, U.S. Pat. No. 6,018,738; D. Donoho, D. Hindawi, and L. Lippincott, Method and Apparatus for Computed Relevance Messaging, U.S. Pat. No. 6,256,664 B1; D. Donoho, D. Hindawi, and L. Lippincott, Inspector for Computed Relevance Messaging, U.S. Pat. No. 6,263,362 B1; A. Lang and D. Kosak, Integrated Collaborative/Content-Based Filter Structure Employing Selectively Shared, Content-Based Profile Data to Evaluate Information Entities in a Massive Information Network, U.S. Pat. No. 6,308,175 B1, A. Lang and D. Kosak, Collaborative/Adaptive Search Engine, U.S. Pat. No. 6,314,420 B1; J. Breese and C. Kadie, Methods and Apparatus, Using Expansion Attributes Having Default, Values, for Matching Entities and Predicting an Attribute of an Entity, U.S. Pat. No. 6,345,264 B1; D. Reed, P. Heymann, S. Mushero, K. Jones, J. Oberlander, and D. Banay, Computer-Based Communication System and Method Using Metadata Defining a Control-Structure, U.S. Pat. No. 6,345,288 B1; J. Breese and C. Kadie, Method and Apparatus, Using Attribute Set Harmonization and Default Attribute Values, for Matching Entities and Predicting an Attribute of an Entity, U.S. Pat. No. 6,353,813 B1; D. Donoho, D. Hindawi, and L. Lippincott, Relevance Clause for Computed Relevance Messaging, U.S. Pat. No. 6,356,936 B1; E. Steeg, Coincidence Detection Method, Products and Apparatus, U.S. Pat. No. 6,493,637 B1; System and Method for Data Collection, Evaluation Information Generation, And Presentation, U.S. Pat. No. 6,539,392 B1; Baudisch, P.; *The Profile Editor: Designing a Direct Manipulative Tool for Assembling Profiles*; Institute for Integrated Information and Publication Systems IPSI, German National Research Center for Information Technology GMD, Germany; J. Budzik et al.; *User Interactions with Everyday Applications as Context for Just-in-time Information Access*; Intelligent Information Laboratory, Northwestern University; J. Budzik et al.; Watson: *Anticipating and Contextualizing Information Needs*; Northwestern University; E. Glover et al.; *Improving Category Specific Web Search by Learning Query Modifications*; NEC Research Institute, Princeton, N.J., EECS Department, University of Michigan, Ann Arbor, Mich., Information Sciences and Technology, Pennsylvania State University; Pazzani et al., *A Framework for Collaborative. Content-Based and Demographic Filtering*; Department of Information and Computer Science, University of California, Irvine; T. Bauer et al.; *Real Time User Context Modeling for Information Retrieval Agents*, Computer Science Department, Indiana University; J. Shavlik et al.; *An Instructable, Adaptive Interface for Discovery and Monitoring Information on the World-Wide Web*; University of Wisconsin-Madison; J. Budzik et al.; Watson; *An Infrastructure for Providing Task-Relevant, Just-In-Time Information; Department of Computer Science*, Northwestern University; and D. Nahl, *Ethnography Of Novices' First Use Of Web Search Engines*: Affective Control In Cognitive Processing; Internet Reference Services Quarterly, vol. 3, no. 2, p. 51–72, 1998.

It would be advantageous to provide a system and an associated method which provides an enhancement to a search system, wherein the results from the search engine are refined or reorganized, based upon information from an identified secondary source. The development of such a search enhancement system would constitute a major technological advance.

It would also be advantageous to provide a system and an associated method which provides an enhancement to a search system, wherein information from an identified secondary source is integrated with a search query, such that results from the search engine are refined or organized, based upon the information from the identified secondary source. The development of such a search enhancement system would constitute a major technological advance.

In addition to search parameters which may be unique to a particular search, there are often parameters that are commonly relevant for a plurality of searches, such as relating to personalized information regarding the user or to similarities between the subject matter of a search. A user is often required to repeatedly input such parameters, along with other parameters that are unique to search.

Several structures and methods-have been described for the searching and sorting of information, based on relevance, personal information, or profiles.

J. Driscoll, Method and System for Searching for Relevant Documents from a Text Database Collection, Using Statistical Ranking, Relevancy Feedback and Small Pieces of Text, U.S. Pat. No. 5,642,502, describes a search system and method for retrieving relevant documents from a text data base collection comprised of patents, medical and legal documents, journals, news stories and the like. Each small piece of text within the documents such as a sentence, phrase and semantic unit in the data base is treated as a document. Natural language queries are used to search for relevant documents from the data base. A first search query creates a selected group of documents. Each word in both the search query and in the documents are given weighted values. Combining the weighted values creates similarity values for each document which are then ranked according to their relevant importance to the search query. A user reading and passing through this ranked list checks off which documents are relevant or not. Then the system automatically causes the original search query to be updated into a second search query which can include the same words, less words or different words than the first search query. Words in the second search query can have the same or different weights compared to the first search query. The system automatically searches the text data base and creates a second group of documents, which as a minimum does not include at least one of the documents found in the first group. The second group can also be comprised of additional documents not found in the first group. The ranking of documents in the second group is different than the first ranking such that the more relevant documents are found closer to the top of the list."

T. Gerace, Method and Apparatus for Determining Behavioral Profile of a Computer User, U.S. Pat. No. 5,848,396, describes a computer network method and apparatus which "provides targeting of appropriate audience based on psychographic or behavioral profiles of end users. The psychographic profile is formed by recording computer activity and viewing habits of the end user. Content of categories of interest and display format in each category are revealed by the psychographic profile, based on user viewing of agate information. Using the profile (with or without additional user demographics), advertisements are displayed to appropriately selected users. Based on regression analysis of recorded responses of a first set of users viewing the advertisements, the target user profile is refined. Viewing by and regression analysis of recorded responses of subsequent sets of users continually auto-targets and customizes ads for the optimal end user audience."

F. Herz, System for Customized Electronic Identification of Desirable Objects, U.S. Pat. No. 6,029,195, describes "customized electronic identification of desirable objects, such as news articles, in an electronic media environment, and in particular to a system that automatically constructs both a "target profile" for each target object in the electronic media based, for example, on the frequency with which each word appears in an artide relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media. Users' target profile interest summaries can be used to efficiently organize the distribution of information in a large scale system consisting of many users interconnected by means of a communication network. Additionally, a cryptographically-based pseudonym proxy server is provided to ensure the privacy of a user's target profile interest summary, by giving the user control over the ability of third parties to access this summary and to identify or contact the user."

A. Lang and D. Kosak, Collaborative/Adaptive Search Engine, U.S. Pat. No. 6,314,420 B1, describe a search engine system "for a portal site on the internet. The search engine system employs a regular search engine to make one-shot or demand searches for information entities which provide at least threshold matches to user queries. The search engine system also employs a collaborative/content-based filter to make continuing searches for information entities which match existing wire queries and are ranked and stored over time in user-accessible, system wires corresponding to the respective queries. A user feedback system provides collaborative feedback data for integration with content profile data in the operation of the collaborative/content-based filter. A query processor determines whether a demand search or a wire search is made for an input query."

D. Kravets, L. Chiriac, J. Esakov, and S. Wan, Search Data Processor, U.S. Pat. No. 6,363,377 B1, describe a "tool to be used with a search engine for a information management system includes methods for refining, filtering, and organizing search queries and search results. A query tuner in the tool allows a user to automatically reformulate a query in order to find a reasonable number of matching documents from the search engine by selectively modifying individual search terms to be weaker or stronger and concurrently requesting a plurality of searches, each with a respectively different modified query. The tool also uses a dynamic filter which employs a dynamic set of record tokens to restrict the results of an arbitrary search query to selectively include or exclude records which correspond to the set of record tokens. The tool also includes a results organizer which aids the user in understanding and visualizing a large number of matching documents returned in response to a search query by clustering like items returned from the search. The query tuner, dynamic filter and results organizer may be used individually or in conjunction. The searched information management system may be consolidated or distributed and may span a global information network such as the Internet."

P. Biffar, Self-Learning and Self-Personalizing Knowledge Search Engine That Delivers Holistic Results, U.S. Pat. No. 6,397,212 B1, describes a search engine which "provides intelligent multi-dimensional searches, in which the search engine always presents a complete, holistic result, and in which the search engine presents knowledge (i.e. linked facts) and not just information (i.e. facts). The search engine is adaptive, such that the search results improve over time as the system learns about the user and develops a user profile. Thus, the search engine is self personalizing, i.e. it collects and analyzes the user history, and/or it has the user react to solutions and learns from such user reactions. The search engine generates profiles, e.g. it learns from all searches of all users and combines the user profiles and patterns of similar users. The search engine accepts direct user feedback to improve the next search iteration One feature of the invention is locking/unlocking, where a user may select specific attributes that are to remain locked while the search engine matches these locked attributes to all unlocked attributes. The user may also specify details about characteristics, provide and/or receive qualitative ratings of an overall result, and introduce additional criteria to the search strategy or select a search algorithm. Additionally, the system can be set up such that it does not require a keyboard and/or mouse interface, e.g. it can operate with a television remote control or other such human interface."

G. Cullis, Personalized Search Methods, U.S. Pat. No. 6,539,377 B1, describes a "method of organizing information in which the search activity of previous users is monitored and such activity is used to organize articles for future users. Personal data about future users can be used to provide different artide rankings depending on the search activity and personal data of the previous users."

Other structures and methods have been described which provide background information regarding the searching and sorting of information, based on relevance, personal information, or profiles, such as: J. Pitkow et al.; *Personalized Search*, Communications of the ACM, vol. 45, no. 9, p. 50–5, September 2002; J. McGowan et al., *Who Do You Want To Be Today? Web Personae for Personalised Information Access*; Adaptive Hypermedia and Adaptive Web-Based Systems. Second International Conference, AH 2002. Proceedings (Lecture Notes in Computer Science Vol. 2347), p. 514–17, 2002; S. Kalajdziski et al.; *Intelligent Recommendation in Digital Library*, Proceedings of the IASTED International Conference Intelligent Systems and Control, p. 408–12, ACTA Press, Anaheim, Calif., USA, 2001; L. Kerschberg et al., *A Semantic Taxonomy-Based Personalizable Meta-Search Agent*, Proceedings of the Second International Conference on Web Information Systems Engineering, vol. 1, p. 41–50; IEEE Comput. Soc., Los Alamitos, Calif., USA, 2002; C. Dichev, *A Framework for Context-Driven Web Resource Discovery*, Modeling and Using Context, Third International and Interdisciplinary Conference, Context 2001, Proceedings (Lecture Notes in Artificial Intelligence, vol. 2116), p. 433–6, Springer-Verlag, Berlin, Germany, 2001; X. Meng et al., *Feasibility of Adding Filtering Process in Web Browser to Improve Web Search Accuracy*, Proceedings of the International Conference on Parallel and Distributed Processing Techniques and Applications, PDPTA '2000, vol. 4, p. 1809–15, CSREA Press, Athens, Ga., USA, 2000; K. Kim et al., *Development of a Personalized Link-Based Search Engine Using Fuzzy Concept Network*, Journal of KISS: Computing Practices, vol. 7, no. 3, p. 211–19, Korea Inf. Sci. Soc., June 2001; C. Yang et al., *A Hybrid Document Clustering for a Web Agent*, Journal of KISS: Software and Applications, vol. 28, no. 5, p. 422–30, Korea Inf. Sci. Soc., May 2001; K. Kim et al.; *A Personalized Web Search Engine Using Fuzzy Concept Network with Link Structure*; Proceedings Joint 9th IFSA World Congress and 20th NAFIPS International Conference (Cat. No. 01TH8569), vol. 1, p. 81–6; IEEE Piscataway, N.J., USA; 2001; A. Scime et al.; *WebSifter: An Ontology-Based Personalizable Search Agent for the Web*; Proceedings 2000 Kyoto International Conference on Digital Libraries: Research and Practice, p. 203–10; IEEE Comput. Soc., Los Alamitos, Calif., USA; 2000; Z. Wei-Feng et al., *Personalizing Search Result Using Agent*, Mini-Micro Systems, vol. 22, no. 6, p. 724–7, Mini-Micro Syst., China, June 2001; P. Chen et al., *An Information Retrieval System Based on a User Profile*, Journal of Systems and Software, vol. 54, no. 1, p. 3"8, Elsevier, Sep. 30, 2000; X. Meng et al., *Personalize Web Search Using Information On Client's Side*, Fifth International Conference for Young Computer Scientists, ICYCS'99, Advances in Computer Science and Technology, vol. 2, p. 985–92; Int. Acad. Publishers, Beijing, China, 1999; P. Chen et al.; *A Personalized Information Retrieval System: Computational Intelligence for Modelling*, Control and Automation, Intelligent Image Processing, Data Analysis and Information Retrieval (Concurrent Systems Engineering Series, vol. 56), p. 247–53, IOS Press, Amsterdam, Netherlands, 1999; S. Laine-Cruzel et al., *Improving Information Retrieval by Combining User Profile and Document Segmentation*, Information Processing & Management, vol. 32, no. 3, p. 305–15; Elsevier, May 1996; D. Boley et al., *Document Categorization and Query Generation on the World Wide Web Using WebACE*: Department of Computer Science and Engineering, University of Minnesota; and A. Pretschner, *Ontology Based Personalized Search*, Dipl.-Inform., RWTH Aachen, Germany, 1998.

Other documents provide background information regarding advancements in search engine structures and processes, such as: European Patent Application No. EP 1 072 982 A2, Method and System for Similar Word Extraction And Document Retrieval; European Patent Specification No. EP 1 095 326 B1, A Search System and Method for Retrieval of Data, and the Use Thereof in a Search Engine; European Patent Application No. EP 1 284 461 A1, Meta-Document Management System With User Definable Personalities; European Patent Application No. EP 1 288 795 A1, Query systems; A. Lang and D. Kosak, System and Method Employing Individual User Content-Based Data and User Collaborative Feedback Data to Evaluate the Content of an Information Entity in a Large Information Communication Network, U.S. Pat. No. 5,983,214; A. Lang and D. Kosak, Multi-Level Mindpool System Especially Adapted to Provide Collaborative Filter Data for a Large Scale Information Filtering System, U.S. Pat. No. 6,029,161; M. Tso, D. Romrell, And D. Gillespie, System for Distributing Electronic Information to a Targeted Group of Users, U.S. Pat. No. 6,047,327; G. Culliss, Personalized Search Methods, U.S. Pat. No. 6,182,068 B1; A. Lang and D. Kosak, Integrated Collaborativel Content-Based Fifter Structure Employing Selectively Shared, Content-Based Profile Data to Evaluate Information Entities in a Massive Information Network, U.S. Pat. No. 6,308,175 B1; D. Chen, Cooperative Topical Servers With Automatic Prefiltering and Routing, U.S. Pat. No. 6,349,307 B1; D. Judd, P. Gauthier, and J. Baldeschwieler, Method and Apparatus for Retrieving Documents Based on Information other than Document Content, U.S. Pat. No. 6,360,215 B1; K. Risvik, Search System and Method for Retrieval of Data, and the Use Thereof in a Search Engine, U.S. Pat. No. 6,377,945 B1; E. Marwell and R. Pines, Personalized Assistance System and Method, U.S. Pat. No. 6,404,884 B1; A. Weissman and G. Elbaz, Meaning-Based Information Organization and Retrieval, U.S. Pat. No. 6,453,315 B1; J. Lee, L. Morgenstern, M. Pedlaseck, E. Schonberg, and D. Wood, System and Method for Collecting and Analyzing Information About Content Requested in a Network (World Wide Web) Environment, U.S. Pat. No. 6,466,970 B1; S. Edlund, M. Emens, R. Kraft, and P. Yim, Labeling and Describing Search Queries for Reuse, U.S. Pat. No. 6,484,162 B1; J. Zhang and M. Ott, Method and Apparatus for Active Information Discovery and Retrieval, U.S. Pat. No. 6,498,795 B1; L. Nikolovska, J. Martino, and A. Camplin, Search User Interface with Enhanced Accessibility and Ease-Of-Use Features Based on Visual Metaphors, U.S. Pat. No. 6,505, 194 B1; M. Bowman-Amuah, Piecemeal Retrieval in an Information Services Patterns Environment, U.S. Pat. No. 6,550,057 B1; Callan, J. et al.; *Document Filtering with Inference Networks*; Computer Science Department, University of Massachusetts; Goker, A.; *Capturing Information Need by Learning User Context*; School of Computer and Mathematical Sciences; The Robert Gordon University; Chen, L. et al.; *WebMate: A Personal Agent for Browsing and Searching*; The Robotics Institute, Carnegie Mellon Institute; Sep. 30, 1997; Cooley, R. et al.; *Web Mining: Information and Pattern Discovery on the World Wide Web*, Department of Computer Science and Engineering, University of Minnesota; Simons, J.; *Using a Semantic User Model to Filter the World Wide Web Proactively*; Nijmegen Institute for Cognition and Information, University of Nijmegen, The Netherlands; Tanudjaja, F. et al.; *Persona: A Contextualized and Personalized Web Search*; Laboratory of Computer Science at MIT, Cambridge, Mass.; Jun. 1, 2001; Yan, T. et al.; SIFT—*A Tool for Wide-Area Information Dissemination*; Department of Computer Science, Stanford University, Feb. 16, 1995; Bianchi-Berthouze, N.; *Mining Multimedia Subjective Feedback*; Journal of Intelligent Information Systems: Integrating Artificial Intelligence and Database Technologies, vol. 19, no. 1, p. 43–59; Kluwer Academic Publishers; July 2002; Widyantoro, D. H. et al.; *A fuzzy Ontology-Based Abstract Search Engine and Its User Studies;* 10th IEEE International Conference on Fuzzy Systems. (Cat. No.01CH37297), vol. 2, p. 1291–4; IEEE, Piscataway, N.J., USA; 2001; Tanudjaja, F. et al.; Persona: *A Contextualized and Personalized Web Search*; Proceedings of the 35th Annual Hawaii International Conference on System Sciences, p. 1232–40; IEEE Comput. Soc, Los Alamitos, Calif., USA; 2002; Widyantoro, D. H. et al.; *Using Fuzzy Ontology for Query Refinement in a Personalized Abstract Search Engine*; Proceedings Joint 9th IFSA World Congress and 20th NAFIPS Internatonal Conference (Cat. No. 01TH8569), vol. 1, p. 610–15; IEEE, Piscataway, N.J., USA; 2001; Ho, M. et al.; *A GA-Based Dynamic Personalized Filtering for Internet Search Service on Multi-Search Engine*; Canadian Conference on Electrical and Computer Engineering 2001, Conference Proceedings (Cat. No.01TH8555) vol. 1, p. 271–6; IEEE, Piscataway, N.J., USA; 2001; Pogaenik, M. et al.; *Layered Agent System Architecture for Personalized Retrieval of Information from Internet*; Signal Processing X Theories and Applications. Proceedings of EUSIPCO 2000. Tenth European Signal Processing Conference, vol. 1, p. 421–4; Tampere Univ. Technology, Tampere, Finland; 2000; Ho, M. et al.; *An Agent-Based Personalized Search on a Multi-Search Engine Based on Internet Search Service*; Intelligent Data Engineering and Automated—IDEAL 2000, Data Mining, Financial Engineering, and Intelligent Agents, Second International Conference, Proceedings (Lecture Notes in Computer Science Vol.1983), p. 404–9; Springer-Verlag, Berlin, Germany; 2000; Wei-Feng, Z. et al.; *Personalizing Search Result Using Agent*; Mini-Micro Systems, vol. 22, no. 6, p. 724–7; Mini-Micro Syst., China; Overmeer, M. A. C. J.; *My Personal Search Engine*; Computer Networks, vol. 31, no. 21, p. 2271–9; Elsevier, Nov. 10, 1999; Pretschner, A. et al.; *Ontology Based Personalized Search*; Proceedings 11th International Conference on Tools with Artificial Intelligence, p. 391–8; IEEE Comput. Soc., Los Alamitos, Calif., USA, 1999; Lee, E. S. et al.; *Agent-Based Support for Personalized Information with Web Search Engines*; Design of Computing Systems: Cognitive Considerations. Proceedings of the Seventh International Conference on Human-Computer Interaction (HCI International '97), vol. 2, p. 783–6; Elsevier, Amsterdam, Netherlands, 1997; and Berger, F. C. et al., *Personalized Search Support for Networked Document Retrieval Using Link Inference*, Database and Expert Systems Applications. 7th International Conference, DEXA '96 Proceedings, p. 802–11, Springer-Verlag, Berlin, Germany, 1996.

It would be advantageous to provide a system and an associated method which provides an enhancement to a search system, wherein a user may specify one or more search parameters, and wherein the user-specified search parameters are integrated into a search query, based on the subject matter of that query. The development of such a search enhancement system would constitute a major technological advance.

As well, it would be advantageous to provide a system and an associated method which provides an enhancement to a search system, wherein a user may specify one or more search parameters, and wherein the user-specified search parameters are integrated into a search query, based on the subject matter of that query, in which the subject matter is either explicitly determined or is implicitly determined, based upon user input. The development of such a search enhancement system would constitute a further technological advance.

Furthermore, it would be advantageous to provide a system and an associated method which provides an enhancement to a search system, in which general search parameters are solicited from a user before a particularized search, and wherein the solicited search parameters are associated with the user and are available for automatic integration into future particularized searches initiated by the user. The development of such a search enhancement system would constitute a further technological advance.

In addition, it would be advantageous to provide a system and an associated method which provides an enhancement to a search system, in which general search parameters are solicited from a user before or after a particularized search, and wherein the solicited search parameters are associated with user selectable editorial content, such as for delivery to the user and/or to other recipients, and are available for automatic integration into future particularized searches, such as initiated by the user or by other recipients that are associated with the user USR, such as a network of friends, family, peers, students, neighbors, people or entities within a zip code region, and/or business associates. The development of such a search enhancement system would constitute a further technological advance.

SUMMARY OF THE INVENTION

The system and method comprises enhancement of results for a search engine, wherein the results from the search engine are refined or reorganized, based upon information from an identified secondary source. The results obtained using a conventional search are compared against the identified secondary source, e.g. a ratings service, and are filtered and/or sorted appropriately. In some embodiments, identification of the secondary source, such as a ratings service comprising information which may supplement the subject of a search query, is based upon information entered by the user. In alternate embodiments, the secondary source is associated with a user, as part of general user-specified search parameters, wherein one or more parameters are consulted automatically for searches for appropriate subject matter.

DETAILED DESCRIPTION OF PREFERRED EMBODIMENTS

Figure 1:
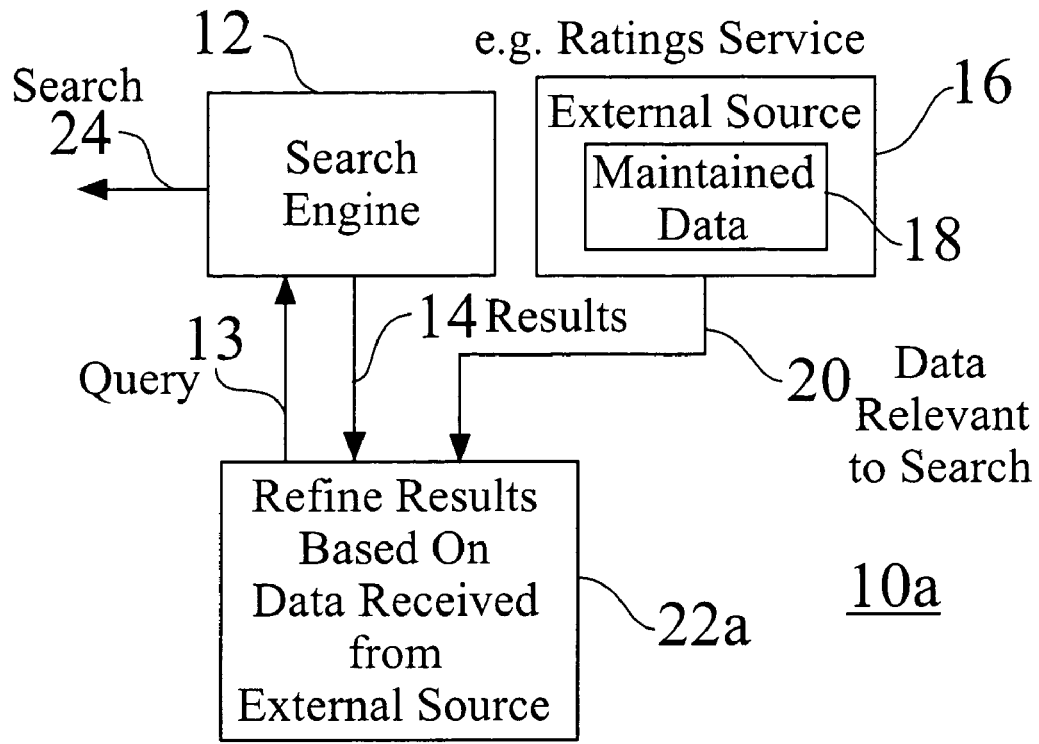
FIG. 1 is a schematic view of a system for customizing results received from a search engine, wherein the customization comprises refinement of the search results based upon information received from an external source.
Figure 2:
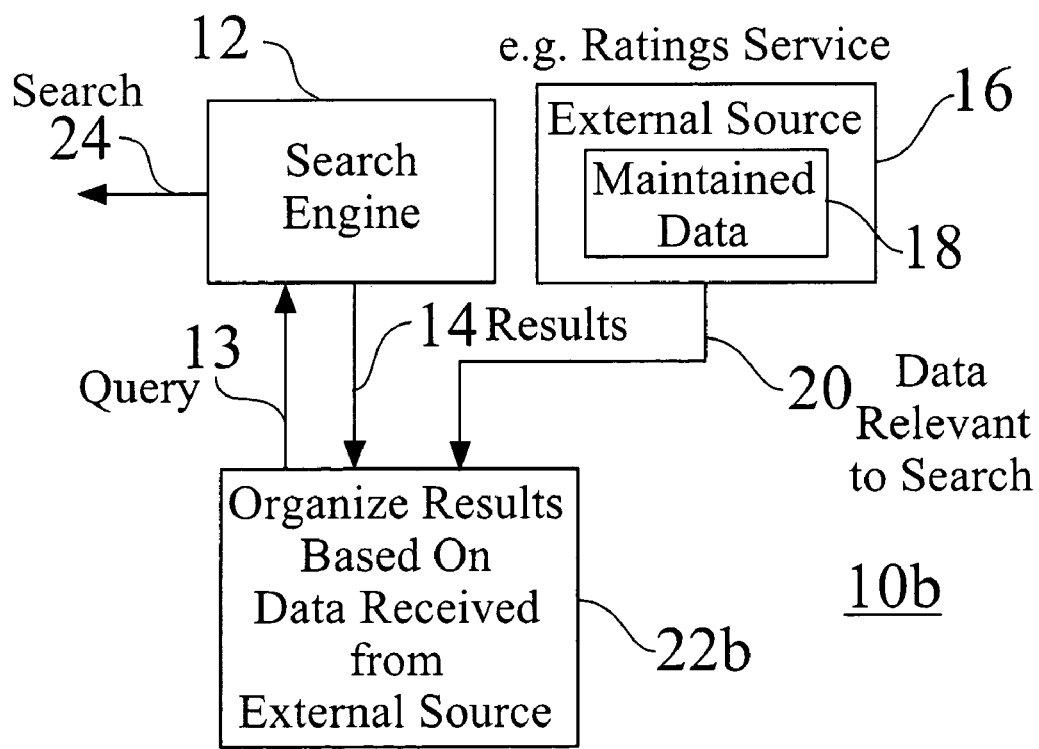
FIG. 2 is a schematic view of an alternate system for customizing results received from a search engine, wherein the customization comprises an organization of the search results based upon information received from an external source.

FIG. 1 is a schematic view of a system 10a for acting upon, i.e. enhancing or customizing 22 (FIG. 3), results 14 received from a search engine 12, wherein the customization 22 comprises refinement 22a of the search results 14 based upon information 18 received 20 from an external source 16. FIG. 2 is a schematic view of an alternate system 10b for customizing 22 results received from a search engine 14, wherein the customization 22 comprises an organization, i.e. ranking 22b, of the search results 14, based upon information 18 received 20 from an external source 16.

The search enhancement system 10 improves current search methodologies, by refining 22a and/or organizing 22b the results 14 of a search engine 12, in compliance with information 18 from one or more sources 16. In a typical system embodiment 10, a user USR (FIG. 3) selects 33 (FIG. 3) an information source 16 to be consulted by a search application 12, in the process of performing a search 24.

In some system embodiments 10, the results 14 of a search 24 are further refined 22a and/or organized 22b, based upon information 18 received from an external source 16. For example, in a user-initiated search 13 for lodging in Austin, Tex., a user specified source 16 may preferably comprise rating information 18 of lodgings, e.g. such as available through American Automobile Association, Inc. (AAA). The rating information 18, from the external source 16, e.g. AAA, is then used to refine 22a and/or organize 22b the results 14 of a general search 24 for any lodging that otherwise meets the search parameters 106,108, e.g. 108a, 108b (FIG. 9, FIG. 10, FIG. 11) within a search query 13. Results from a conventional search engine 12 may therefore be refined 22a and/or reorganized 22b, based on data 18 independently maintained by a ratings service 16.

In alternate system embodiments 10, information 18 received from an external source 16 is integrated within a search query 13, such that the search 24 is enhanced by the information 18, whereby the results 14 of the search 24 may be inherently refined 22a and/or organized 22b as a function of the information 18 received from an external source 16. For example, information 18 received from a user-selected source 16 may be consulted when performing a search 24, such that a set of one or more search results 14 complies with a search query 13 comprising both search parameters 108, 106 entered by a user USR, in addition to meeting parameters imposed by the information 18 received from the external source 16.

For example, in a similar user-initiated search 13 for lodging in Austin, Tex., a user specified source 16 which comprises rating information 18 of lodgings can alternately be included in the search 24, i.e. to refine or organize the search results 14, whereby the results of the general search 24 meet the user-specified search parameters 108,106, and also comply with rating information 18 provided by a selected ratings service 16.

In some system embodiments 10, the external information 18 can be combined with other external information 18. In the above example, in a user-initiated search 13a for lodging in Austin, Tex., wherein a user specified source 16 comprises rating information 18 of lodgings, the rating information 18 can be combined with policy information 18, such as to further refine or organize the search results 14, to lodging which is approved by a secondary external source 16, e.g. an accounting department, associated with the user USR, to be within a specified cost per diem amount.

Supplementary external information 18 may also correspond to people or entities which are associated with the user USR, e.g. such as a network of friends, family, peers, students, neighbors, people or entities with a zip code region, and/or business associates. For example a user USR may be interested in the enhanced results 40 based on ranking information 18 from:

Expert entities, e.g. Zagats, AAA, or a movie critic;
Celebrities, e.g. Michael Jordan, John Cusack, or Sarah Michelle Gellar; or
People similar to the user USR, i.e. "people like me", such as local people of a similar age and/or education level, immediate friends or friends of friends.

In system embodiments 10 in which information 18 from an external source 16 is combined with information 18 from one or more other external sources 16, the enhanced search results 40 preferably yield a composite refinement or ranking 22, for a user USR. For example, in a search for local services or people, e.g. a roofing contractor, a user USR can combine a general search for local contractors within a desired area, e.g. within a city, county, or zip code, and can rank the results based on information from a ratings service 18, and/or with information 18 from other external sources 16, such as review information from people, e.g. such as neighbors who have used roofing contractors, other users USR, recipients RCP (FIG. 3), and/or experts.

Figure 3:
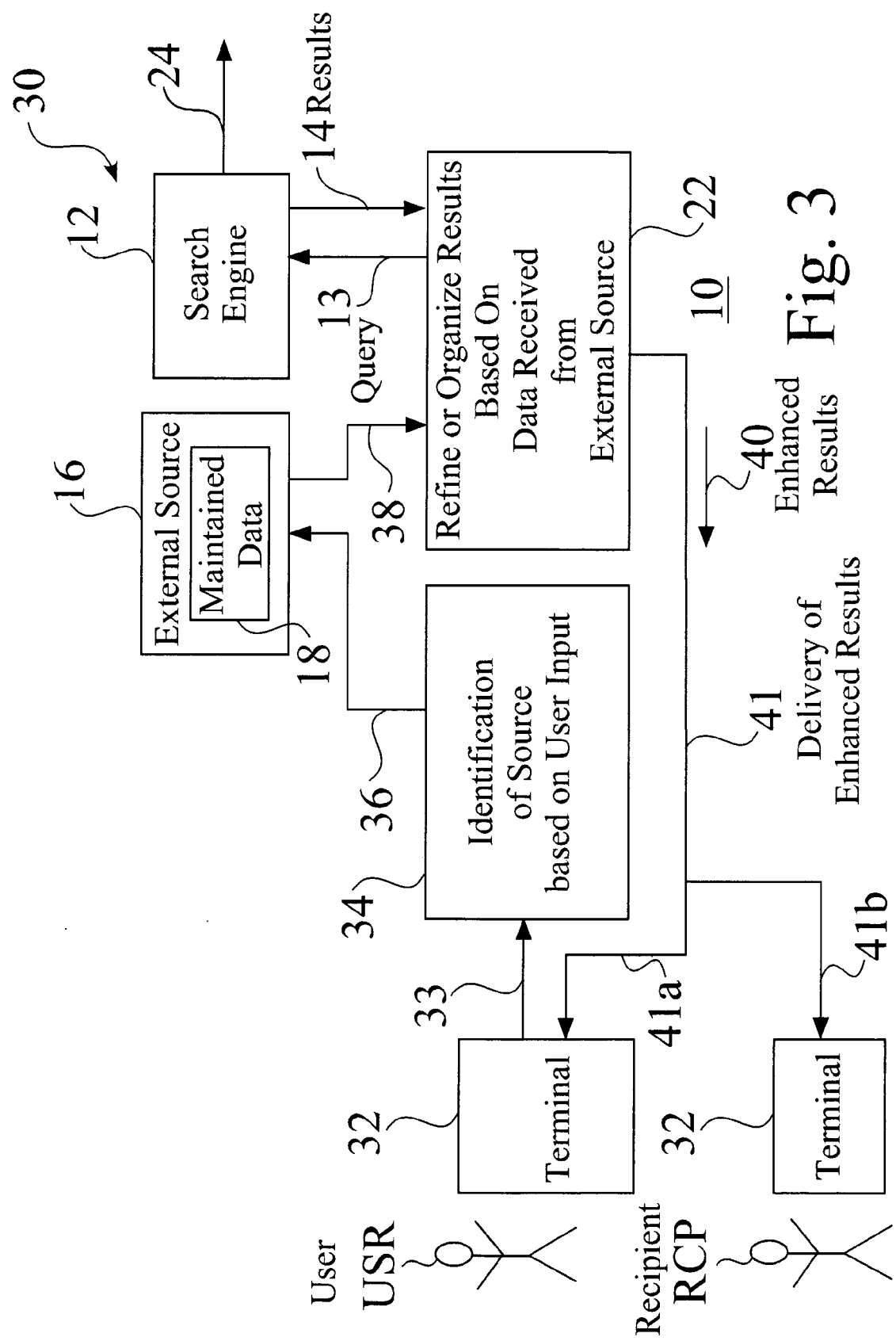
FIG. 3 is a schematic diagram of user identification, i.e. selection, of an external source within a system for further acting upon results received from a search engine.

FIG. 3 is a schematic diagram 30 of user identification, i.e. selection 33 of an external source 16 within a system 10 for further acting 22 upon results 14 received from a search engine 12. A user USR typically interacts with the system 10 through a terminal 32, such as a personal computer, laptop computer, or other networked device, such as a personal digital assistant, a network enabled portable phone, or other wired or wireless device.

Through user identifier input 33, the system 10 determines, i.e. identifies 34 one or more selected external sources 16, either directly, e.g. through explicit entry 33 of the identity of a source 16, or indirectly, e.g. through an implicit determination of an identity of a source 16, such as through the determination of subject matter of a search query 13, and a determination of one or more sources 16 that have information 18 which pertains to the determined subject matter.

The system 10 retrieves information 38 from an external source 16, such as though a an information query 36. Based upon data received 38 from a selected source 16, the system 10 returns 41 enhanced search results 40, e.g. such as by returning 41a to the user USR, through the terminal 32, and/or by delivering results 41b to one or more recipients RICP, such as through terminals 32.

In some system embodiments 10, recipients RCP are explicitly determined by the user USR. In other system embodiments 10, recipients RCP may be inferentially determined by the user USR, such as comprising one or more recipients RCP that are associated with the user USR, e.g. such as a network of friends, family, peers, students, neighbors, people or entities with a zip code region, and/or business associates. For example, a query 13 from a user USR regarding museums in Paris, France may be refined 22a or ranked 22b, and then may be forwarded 40b to recipients RCP, such as to recipients RCP that choose 86 (FIG. 7) to receive 41b, or are chosen to receive 41b, the information.

Figure 7:
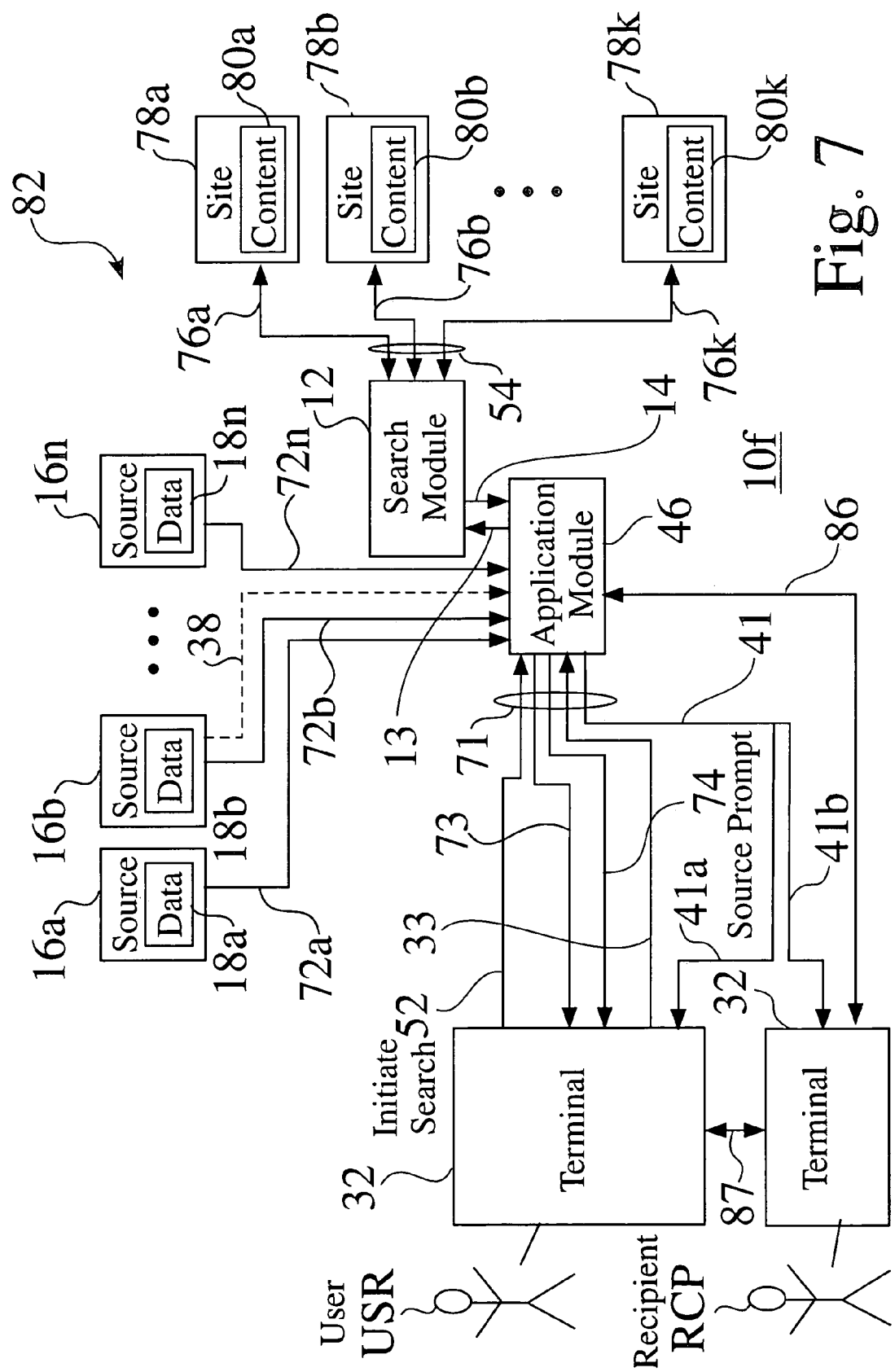
FIG. 7 is a functional block diagram of operation within an alternate modular system for customizing results received from a search engine implemented in conjunction with a conventional search engine.

In some system embodiments 10, recipients RCP may be inferentially determined by the search parameters or search results, such as comprising a one or more recipients RCP for which editorially ranked 22a or sorted 22b content 40 is determined to be valid. For example, a query 13 from a user USR regarding museums in Paris may be refined 22a or ranked 22b, and then may be forwarded 40b to recipients RCP, such as to recipients RCP that have expressed interest in art, and/or France, such as through recipient input 86 (FIG. 7).

The search enhancement system 10 may therefore be preferably used to provide editorially refined 22*a* or ranked 22*b* results, as a result of a user selectable editorial search 13,22, for delivery to the user USR and/or to one or more recipients RCP.

As discussed above, in some system embodiments 10, the results 14 of a general search query 13 are acted upon 22 by the information 18 from the selected source 16, while in alternate system embodiments 10, the information 18 from the selected source 16 is integrated within the query 13, to provide search results 14 that correspond to both the general search parameters 108,106, as well as to the supplemental information 18 from the selected source 16.

Figure 4:
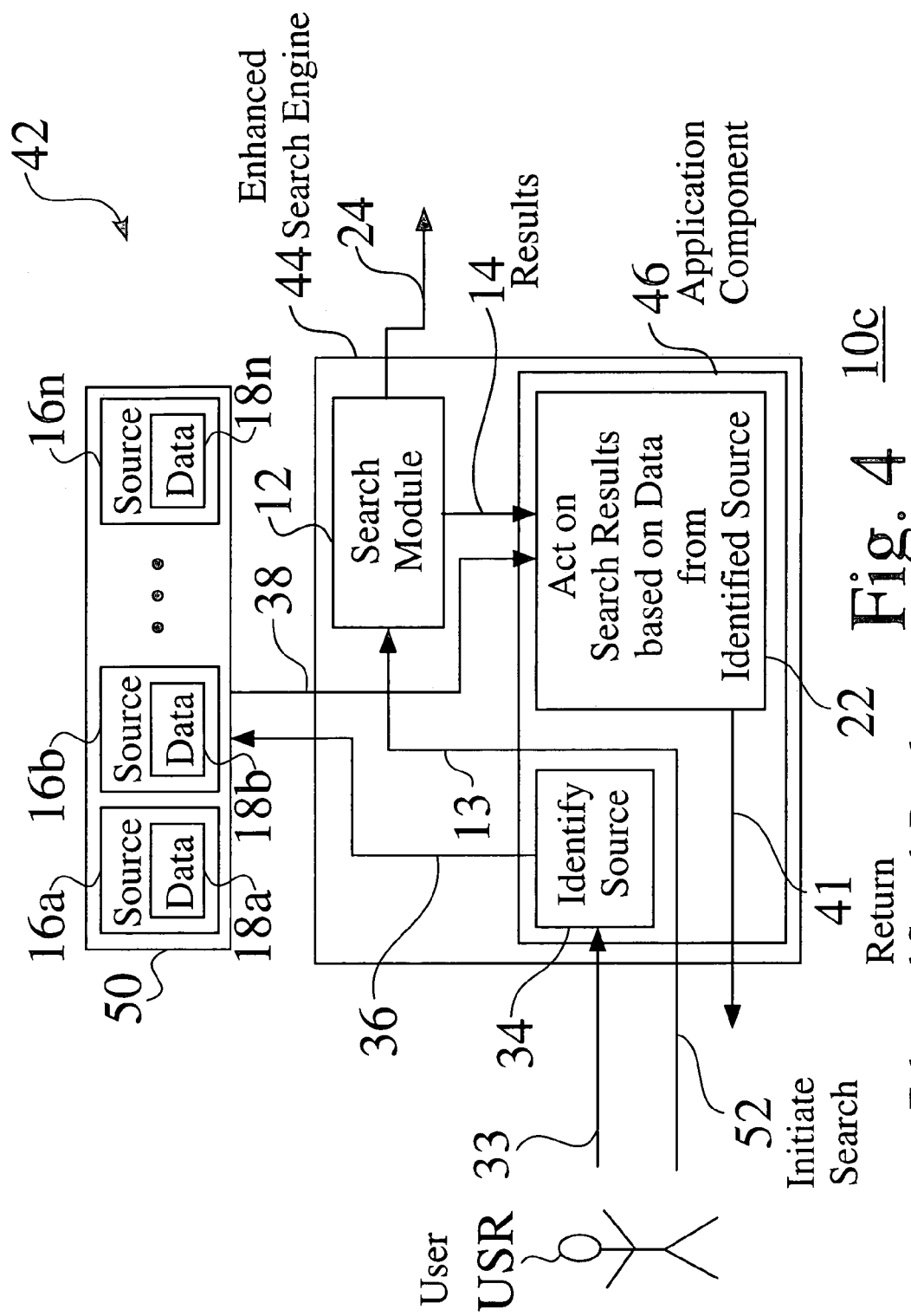
FIG. 4 is a schematic view of a system for acting upon results received from a search engine implemented within an integrated application.
Figure 5:
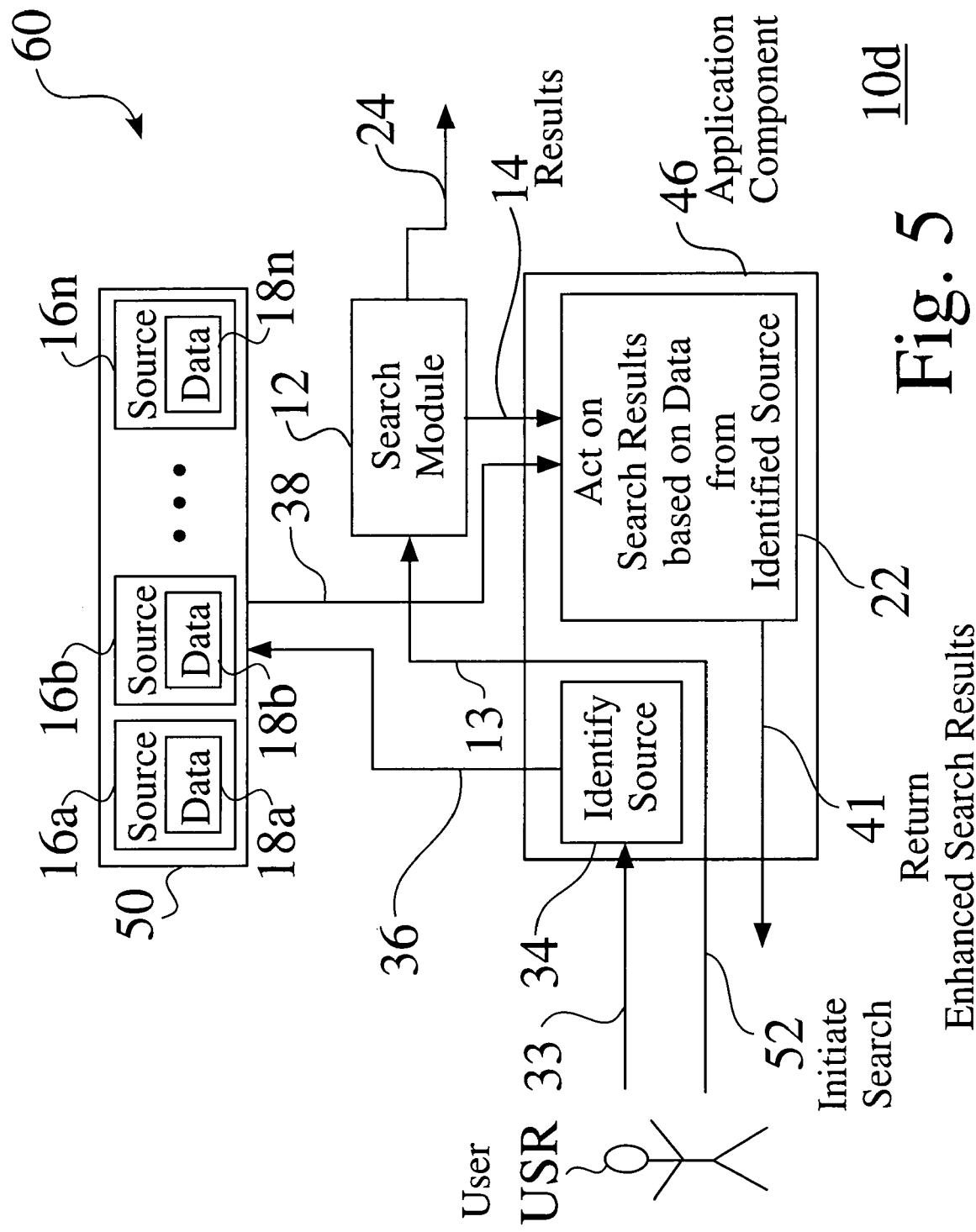
FIG. 5 is a schematic view of an alternate modular system for customizing results received from a search engine implemented in conjunction with a conventional search engine.

User Source Selection and Delivery of Enhanced Search Query Results. FIG. 4 is a schematic view 42 of a system 10*c* for acting upon results 14 received from a search engine 12 implemented within an integrated search structure 44, i.e. an enhanced search engine 44. FIG. 5 is a schematic view 60 of an alternate modular system 10*d* for customizing results 14 received from a search engine 12 implemented in conjunction with a modular application component 46.

As seen in FIG. 4, system source identification 34 and information processing 22 in a system 10*c* are readily implemented within an application component 46 which is integrated 44 with a search engine 12. When a user USR initiates 52 a search 24, the application component 46 shown in FIG. 4 provides source identification 34, based upon user selection 33, and either acts 22 upon the results 14 of a general query 13 that meets user search criteria 106,108 (FIG. 9), or alternately modifies the query 13, based upon information 18, e.g. 18*b*, from one or more selected sources 16, e.g. 16*b*.

As seen in FIG. 5, the system source identification 34 and information processing 22 in a system 10*d* are implemented within a modular, i.e. distinct, application component 46 which is in associated with a discrete search engine 12. For example, an application component 46 for source identification 34 and information processing 22 may operate as a separate component in relation with an existing search engine 12, whereby information 18 from a selected source 16 is either integrated into a search query 13, e.g. such as through additional Boolean string elements, or is used to process 22 the results 14 of a query 13.

Figure 6:
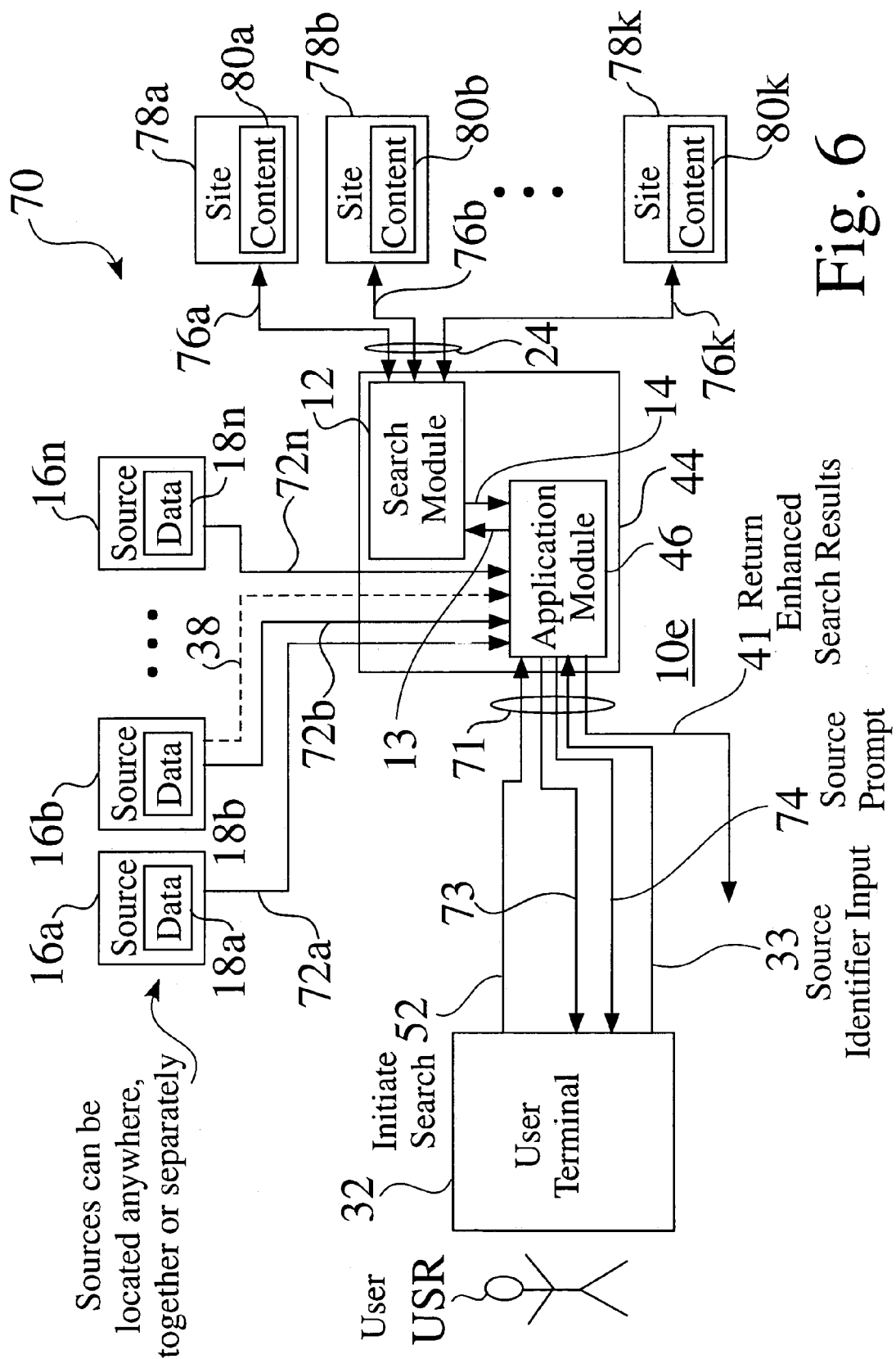
FIG. 6 is a functional block diagram of operation within a system for customizing results received from a search engine implemented within an integrated application.

System Operation. FIG. 6 is a functional block diagram 70 of operation within a system 10*e* for acting upon results 14 received from a search engine 12 implemented within an integrated search structure 44. FIG. 7 is a functional block diagram 82 of operation within an alternate modular system 10*f* for customizing results 14 received from a search engine 12 implemented in conjunction with a modular application component 46.

Figure 8:
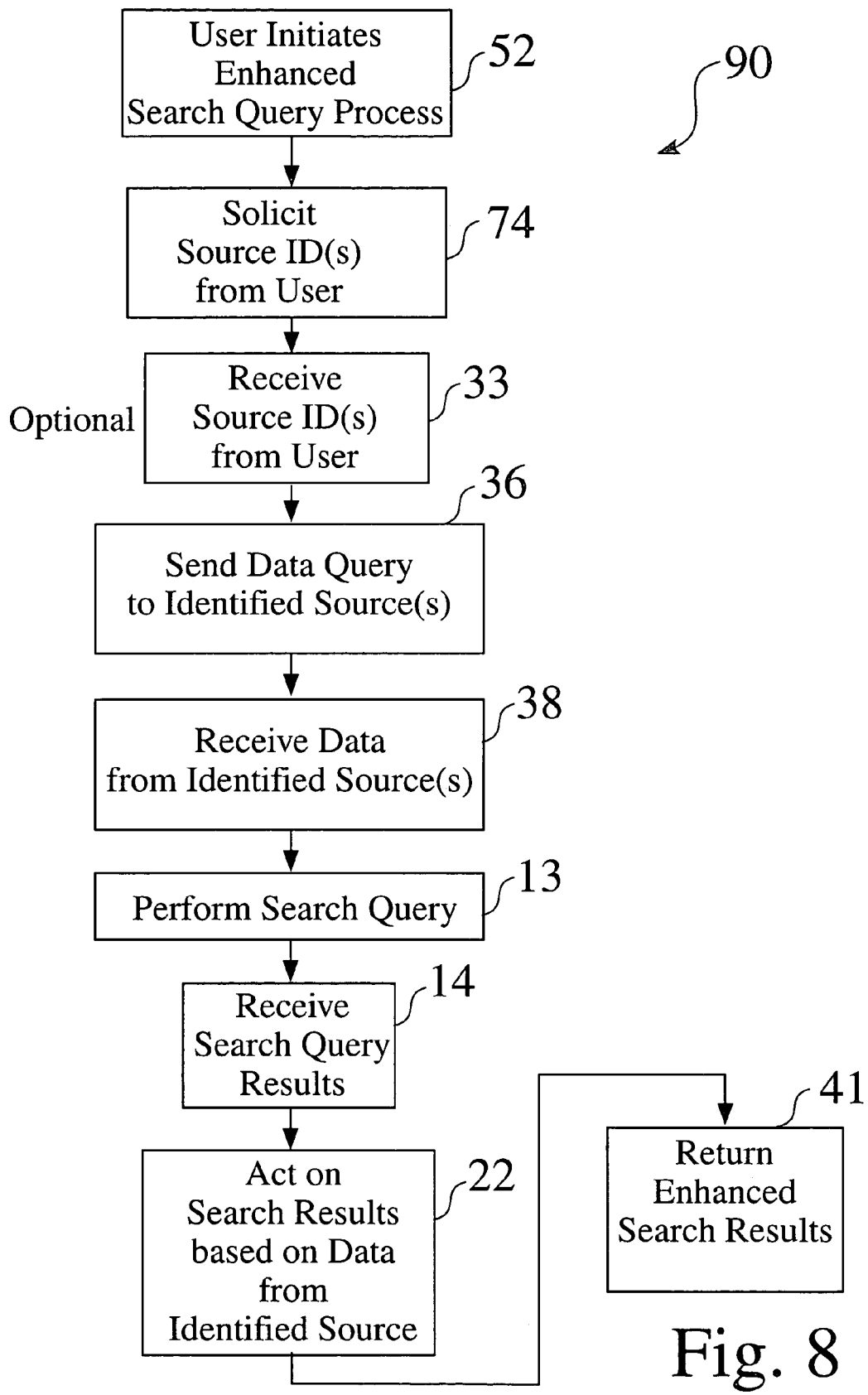
FIG. 8 is a flowchart showing a process for identification of one or more external sources, and for refining search results based upon information received from the identified sources.

FIG. 8 is a flowchart showing an exemplary process 90 for an enhanced search system 10, comprising identification 33 of one or more external sources 16, and the enhancement 22 of search results 14 based upon information 18 received from one or more identified sources 18.

As seen in FIG. 6 and FIG. 7, a user USR interacts 71 with the enhanced search system 10, typically between a user terminal 32 and an application module 46. Typical interactions 71 between a user terminal 32 and the application module 46 comprise search initiation 52, the return of standard, i.e. non-enhanced, search results 73, source prompts 74, source identification inputs 33, and/or the return 41*a* (FIG. 3) of enhanced results 40.

In some embodiments of the enhanced search system 10, as seen in FIG. 7, one or more recipients RCP at terminals 32 may also interact 86 with the application module 46. Typical interactions 86 between a recipient terminal 32 and the application module 46 comprise establishment of relationships 87, e.g. such as between users USR and recipients RCP, and/or an input of preferences or interest in the receipt 41*b* of enhanced system content 40.

The application module 46 has access 72, e.g. 72*a*–72*n*, to one or more sources 16, e.g. 16*a*–16*n*, having associated data 18, e.g. 18*a*–18*n*. The sources 16*a*–16*n* are typically accessible across a network, e.g. such as but not limited to the Internet. In some system applications 10, the associated data 18 is sent 72 to the application module 46 before source identification 33 from a user USR, such that information 18 associated with a source 16 is internally available within the application module 46. In other system applications, the associated data 18 is sent 72 to the application module 46 upon source identification 33 from a user USR, wherein information associated with a source 16 is typically queried 36 (FIG. 5) and retrieved 38 by the application module 46.

As seen in FIG. 6 and FIG. 7, a search engine 12 is associated with application module 46. The search engine 12 has access 76, e.g. 76*a*–76*k*, to one or more external sites, sources or documents 78, e.g. 78*a*–78*k*, having associated content 80, e.g. 80*a*–80*k*. The search engine 12 typically retrieves information content 80 that corresponds to a search query 13.

In the exemplary process 90 shown in FIG. 8, when a user USR initiates a search query process 52, the application module 46 typically solicits 74 the identification 33 of one or more sources 16 comprising data 18 which may be used to enhance the value of a search 24, e.g. to improve the quality and/or ordering of search results 14. In some system embodiments 10, a source solicitation 74 comprises a choice of one or more selectable sources 16, typically comprising sources 16 that are either explicitly available to the user USR, or are implicitly determined, e.g. such as travel related sources 16 if a search query 13 comprises one or more search parameters 108 within a search string 106 (FIG. 9 to FIG. 11), which indicate that the user USR is searching for lodging or travel accommodations.

Upon a receipt 33 of source identification from a user USR, the application module 46 typically sends a data query 36 to any identified sources 16, 1*f* the available data 18 from an identified source 16 is not yet available. Upon a data query 36, the data 18 is sent from an identified source 16, either to be included in a search query 13, or to be used in the processing 22 of search results 14. The application module 46 produces 22 the enhanced results 40, which are then sent 41*a* to the user terminal 32, and/or sent 41*b* to recipients RCP.

Conventional search engines typically compare input search terms 108 against content or metadata 80, to identify displayable results. Some search processes also allow for refined searching in input terms 108, against particular identified types of content or metadata 80. For example, when performing a patent search, a user USR is able to enter "SN" to indicate that subsequent search terms 108 should be applied against serial number metadata. Furthermore, some of the conventional search engines permit comparison of input search terms against full or partial text.

When applying conventional search technology, users USR typically obtain several pages of search results for any given search query, necessitating an extended period of review. For example, a common problem which is often encountered with conventional search queries is that the found set 138 (FIG. 11) of matching sites or information sources 78 is often too large, e.g. such as if too few search terms 108 (FIG. 11) are entered within a string 106 (FIG. 11), or if the search terms 108 are too general. A user USR must often either manually browse through a large number of found content 80 to find relevant sites 78, or must perform a different search 24, typically having different terms 108 and/or additional terms 108, in the hopes of more accurately finding the desired sites 78 and information 80.

A similar problem that is also encountered with conventional search inquires is that the found set 138 of matching sites or information sources 78 is often too small, e.g. such as if too many search terms 108 are entered within a string 106, or if the search terms 108 are too narrow in scope. A user USR then is typically required to perform another search, typically having different terms 108 and/or less terms 108, in the hopes of finding a larger found set 138 of desired sites 78 and information 80.

Figure 9:
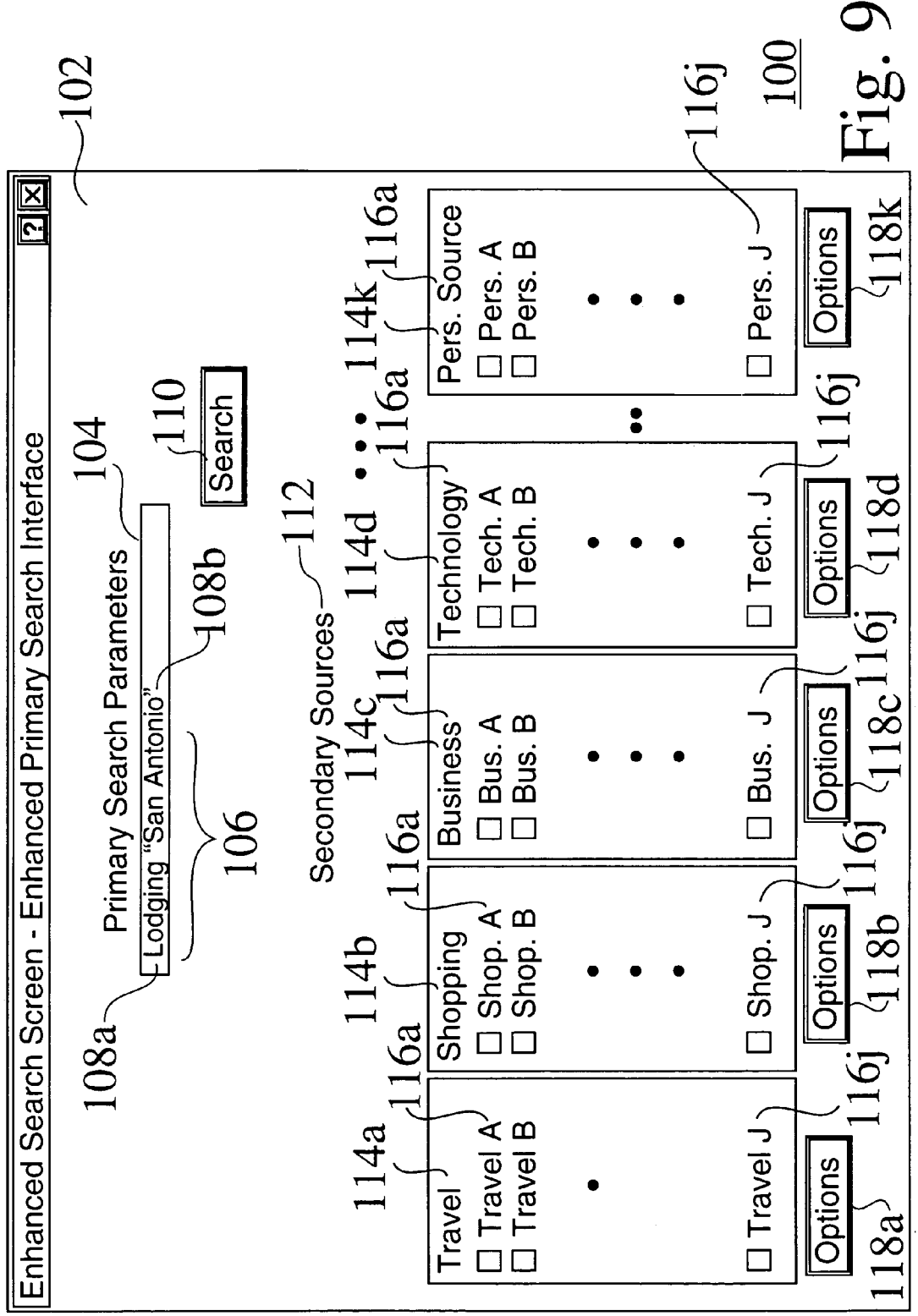
FIG. 9 is a schematic diagram of an enhanced primary search input screen.

FIG. 9 is a schematic view 100 of an enhanced primary search user entry screen 102 for a search engine 12, in which a user USR may preferably select one or more sources 16 at the same time as primary search parameters 108, e.g. 108a–108b, are entered. As seen in FIG. 9, an input screen 102 comprises a parameter input window 104, wherein a user USR can input one or more search parameters 108, e.g. 108a, 108b, such as within a Boolean string format 106. If a primary search 24 is desired, i.e. without a selection of secondary sources 16, a search control 110 may preferably be activated, such that the primary search 24 is based only upon the primary search parameters 108, e.g. 108a,108b, such as within a search string 106.

The enhanced primary search user entry screen 102 shown in FIG. 9 also comprises secondary source selection 112, comprising one or more subject sources 116a–116j within one or more search subject groups 114a–114k. For example, within a travel subject group 114a, one or more travel subject sources 116a–116j are selectable by the user USR, such that corresponding sources 16 are referenced in association with a search 24 corresponding to the primary search parameters 108. A search subject group 114 may comprise any of a wide variety of selectable subjects 114, such as but not limited to travel, shopping, business, technology, or personal sources 114. The displayed selection of subjects 114 and subject sources may reflect general subject areas, i.e. for general user audiences, or may alternately reflect more specialized professional or personal interests, such as internet-based opinion, review, and/or ratings sources 16.

The search subject groups 114a–114k shown in FIG. 9 also comprise corresponding options control 118a–118k, such as to add or subtract desired source choices 116, and/or to select options based upon a source 16, such as to select a desired rating level of lodging, e.g. 4 stars, based upon a selected source 16.

As seen in FIG. 9, the source selectors 116 allow selection of one or more secondary sources 16. In some system embodiments 10, information 18 associated with a source selection 116 accompanies the general search parameters 106,108 during a search 24. In alternate system embodiments 10, information 18 associated with a source selection 116 is used to enhance 22 the results 20 of a general search 24 that is based upon the parameters 106,108.

In some system embodiments, preliminary source selectors 116 comprise selectable choices of external sources 16, such as ranking sources 16, such as a ratings service 16 for restaurants, e.g. zagats.com, available through Zagat Survey LLC, of New York, N.Y. When searching for a restaurant using a search engine 12, a user USR may find it helpful to filter 22a or sort 22b results based on a rating from a ratings service 16. More specifically, the user USR can search for and display only restaurants with a Zagats rating higher than two, or the user USR may search for all restaurants meeting a specified criteria, and sort all restaurant hits based on the Zagats rating. Similarly, when searching for lodging using a search engine 12, a user USR may find it helpful to filter 22a or sort 22b results based on a rating from a travel related ratings service 16, e.g. such as ratings provided by American Automobile Association, Inc. (AAA).

Figure 12:
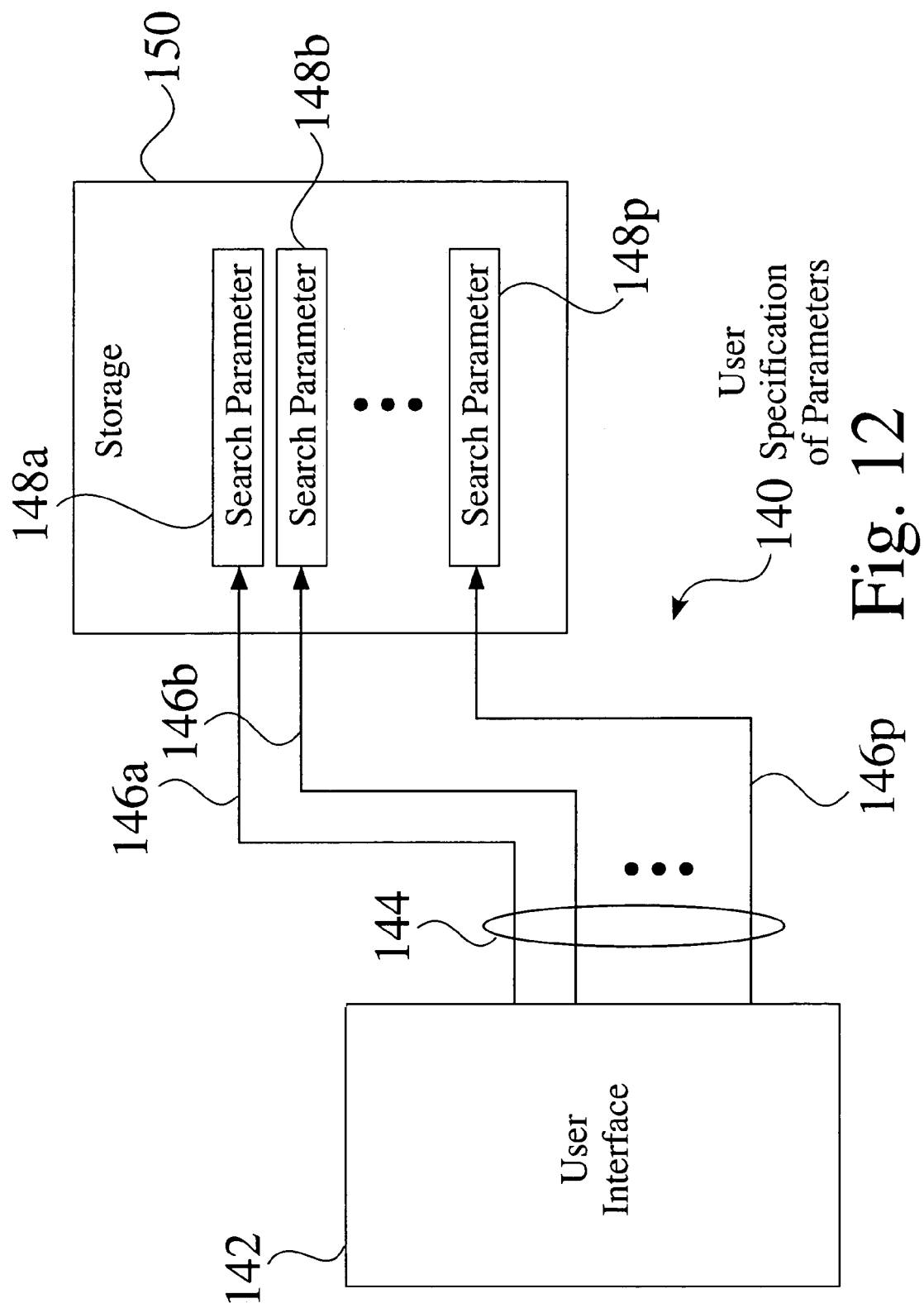
FIG. 12 shows user specification of secondary search parameters.

Some system embodiments 10 allow express entry by the user USR of information in a search string, such as within the primary input window 104, to enable identification of such a source. In an alternative implementation, a source, e.g. Zagats or AAA, and an appropriate rating for a source 16, e.g. a Zagats rating equal to 2, may be associated with a user USR as a part of general user-specified search parameters 148, e.g. 148a (FIG. 12), in which one or more user-specified parameters 148 may be consulted automatically for searches of appropriate subject matter. In alternate system embodiments 10, the preliminary source selectors 116 comprise selectable choices of user-defined sources 16, such as to include one or more-user-selected parameters 148 (FIG. 12).

In some embodiments, the selected 116 external sources 16 are included along with the primary search parameters 108. In alternate embodiments, selected external sources 16 are referenced to refine 22a and/or reorganize 22b results 14 of a search 24 based upon the primary search parameters 108 within the search string 106, i.e. the search engine 12 conducts a search 24, based upon parameters 106,108, wherein the results of a search 24 typically include all sites or sources 78 which meet the search parameter set.

Figure 10:
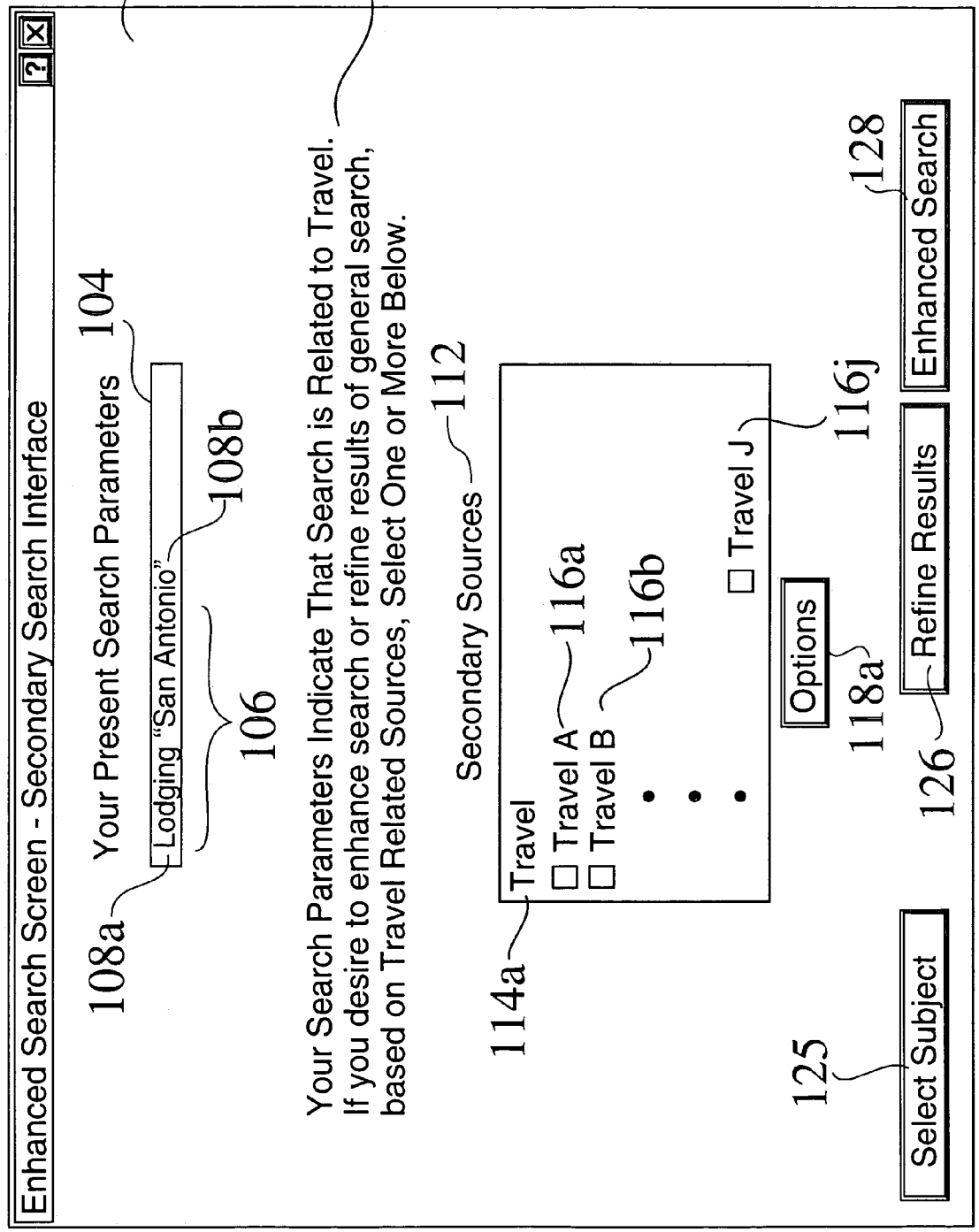
FIG. 10 is a schematic diagram of an enhanced search system source selection screen.

FIG. 10 is a schematic diagram 120 of an enhanced search system source selection screen 122. As described above, a user USR may initiate 52 a search 24, such as based upon one or more search parameters 108 within a search string 106. In some embodiments of an enhanced search system 10, a solicitation, i.e. source prompt 74 may be made, such that a user USR can select one or more sources 16 which can be used to refine 22a and/or organize 22b the results of a search 24.

As seen in FIG. 10, the enhanced search system source selection screen 120 preferably displays entered search parameters 106,108, and may also display a search subject 124, e.g. such as but not limited to travel, cuisine, technical, biographical, cultural, or business subjects. The search subject 124 may be determined either explicitly or implicitly from the search parameters 106,108, or may otherwise be selected or determined, such as by user subject selection control 125. The system source selection screen 122 shown in FIG. 10 also comprises a secondary source selection 112, from which one or more subject selections 116a—116j may be made by a user USR. The exemplary subject selection option 114a shown in FIG. 10 corresponds to one or more travel related source selections 116, e.g. 116a–116j, based on the determined subject 124. The enhanced search system source selection screen 120 also comprises a refine results control 126 and an enhanced search control 128, whereby a user USR can control search refinement or organization 22, based upon source selections 116.

The secondary source selection 112, as shown in FIG. 10, may alternately correspond to people or entities which are associated with the user USR, e.g. such as a network of friends, family, peers, students, neighbors, people or entities with a zip code region, and/or business associates. For example, the secondary source selection 112 may provide system access to external information or input 18 from one or more recipients RCP that are associated with the user USR. In another example, the secondary source selection 112 may provide system access to external information or input 18 from:

- Expert entities, e.g. Zagats, M A, or a movie critic;
- Celebrities, e.g. Michael Jordan, John Cusack, or Sarah Michelle Gellar; and/or
- People similar to the user USR, i.e. "people like me", such as local people of a similar age and/or education level, immediate friends or friends of friends.

Figure 11:
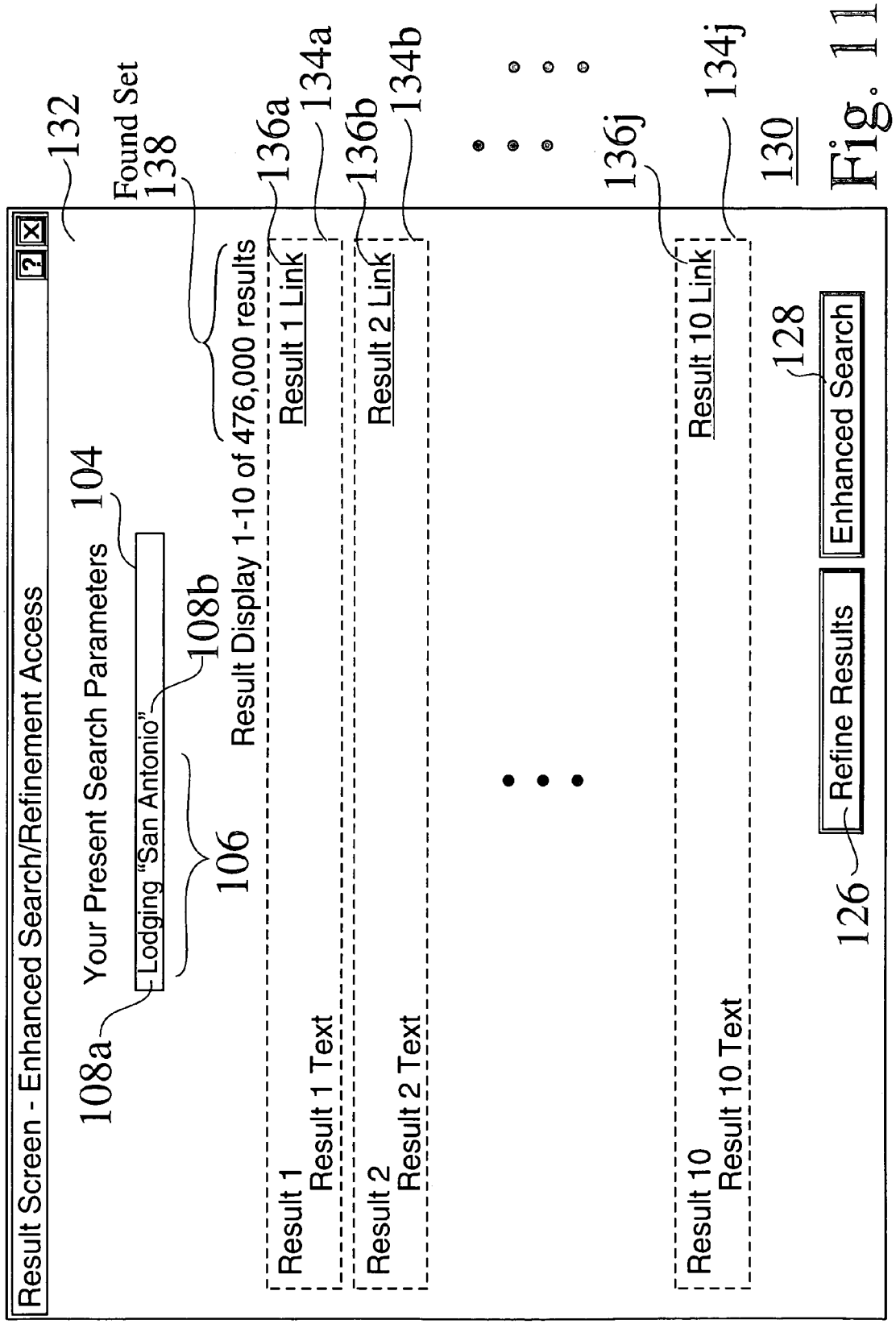
FIG. 11 is a schematic diagram of a primary search result screen further comprising enhanced source solicitation control.

FIG. 11 is a schematic diagram 130 of a primary search result screen 132 further comprising enhanced source solicitation control 126,128. As described above, a search 24 which comprises only primary search parameters 108, e.g. 108,108b, such as within a search string 106, may often yield a large found set 138 of results 134, e.g. 134a–134j. In some embodiments of the enhanced search system 10, such as integrated with a conventional search engine 12, an enhancement of a search 24 may comprise processing 22, e.g. refinement 22a and/or organization 22b, of a found set 138 from a search 24. The enhanced source solicitation control 126,128 shown in the primary search result screen 132 allows a user USR to operate 22 on the results of a search 24, such as by navigation to a enhanced search system source selection screen 120, as seen in FIG. 10.

The source solicitation screen 132 may alternately comprise a selection sources 16 which are implicitly determined, such as based on entered search parameters 108. For example, in a user USR entered search string 106 which includes a term lodging, a choice of travel specific sources 16 may be provided for the user USR, such as to refine a search based upon ratings from one or more travel-related sources 16.

The search enhancement system 10 is readily implemented to provide a great value for a user USR, in which information from one or more secondary sources 16 can be explicitly or implicitly accessed and integrated to refine or organize the results of a search. The search enhancement system 10 improves current search methodologies, since a user USR can specify one or more user-selected information sources to be consulted by a search application module 46 when performing a search. Results 14 from a conventional search engine 12 may be refined or re-organized based on data independently maintained by a selected source 16, such as a ratings service 16.

In either case, the results obtained using a conventional search may be compared against the identified source ratings service 16 and filtered 22a and/or sorted 22b appropriately. System functions may be performed by an integrated search engine 44, or alternatively, by an application module 44 associated with a search engine 12, such that no modification is necessary to the conventional search engine 12.

Since conventional search engines 12 allow only explicit entry of search terms 106, 108, such as within a search string interface 104, a user USR is typically required to repeat searches using a plurality of combinations of search parameters 108 and search strings 106, in order to receive an acceptable quality and quantity of search results, i.e. hits.

The enhanced search system 10 provides structures and associated processes which allow a user USR to enhance either the search or the results of a search, based upon information from one or more selected sources. A wide variety of selectable sources 16, from which supplementary information 18 is accessed, may be used, such as external services 16, e.g. ratings services, or user-specified sources, e.g. such as user-defined ratings or search parameters.

Enhanced Search System having Personal Search Parameters. Some preferred embodiments of the enhanced search system 10, such as log (FIG. 15), comprise the selection 33 of one or more user-specified search parameters 148, e.g. 148a (FIG. 12).

Some embodiments of the enhanced search system 10 having personal search parameters 148 comprise a solicitation of general search parameters 148 from a user USR, before a particularized search 24 is initiated 52. The solicited search parameters 148 are thereafter associated with the user USR, such that parameters 148 are available for automatic integration into future particularized searches initiated 52 by the user USR.

FIG. 12 is a schematic diagram 140 which shows user specification 146a–146p of one or more secondary search parameters 148a–148p, such as through a user interface 142. The specified parameters 148a–148p are typically stored 150, such as at one or more locations, which can be located at a wide variety of locations within an enhanced search system 10, such as within a user terminal 32, at an enhanced search application module 46, in combination with a search engine 12, or at one or more locations throughout the system, such as at a service provider or a personal web site.

The generalized search parameters 148 may pertain to a variety of different subject matters 168 (FIG. 13), and represent information useful in enhancing a search for a user USR and/or other recipients RCP, such as by filtering, further filtering, or sorting search results obtained when performing searches 54. For example, generalized search parameters 148 may include the user's address and health insurance carrier, such that future particularized searches for medical care providers may be automatically refined or organized based on proximity and eligibility.

In a conventional search environment, a user USR must often enter detailed personal search parameters within a search string, if personal criteria are to be considered at the time of a search. Therefore, a user USR is often required to understand the search engine, and to remember the parameters at the time of the search.

The use of user specified generalized search parameters 148 readily provides an improved search environment, since a user USR is not required to manually manipulate a conventional search engine 12, through the entry of detailed search parameters 108, to consider personal criteria at the time of a particularized search. As well, a user USR is not required to understand the detailed string parameter format 106 of a search engine 12, nor is a user USR required to remember and enter personalized parameters 148 at the time of a search.

The use of generalized search parameters 148 relieves the user USR of the burden of sifting through pages of search results that are not relevant or customized to their needs, for instance, medical care providers the are not proximate to their home or eligible under their insurance in the example above.

Figure 13:
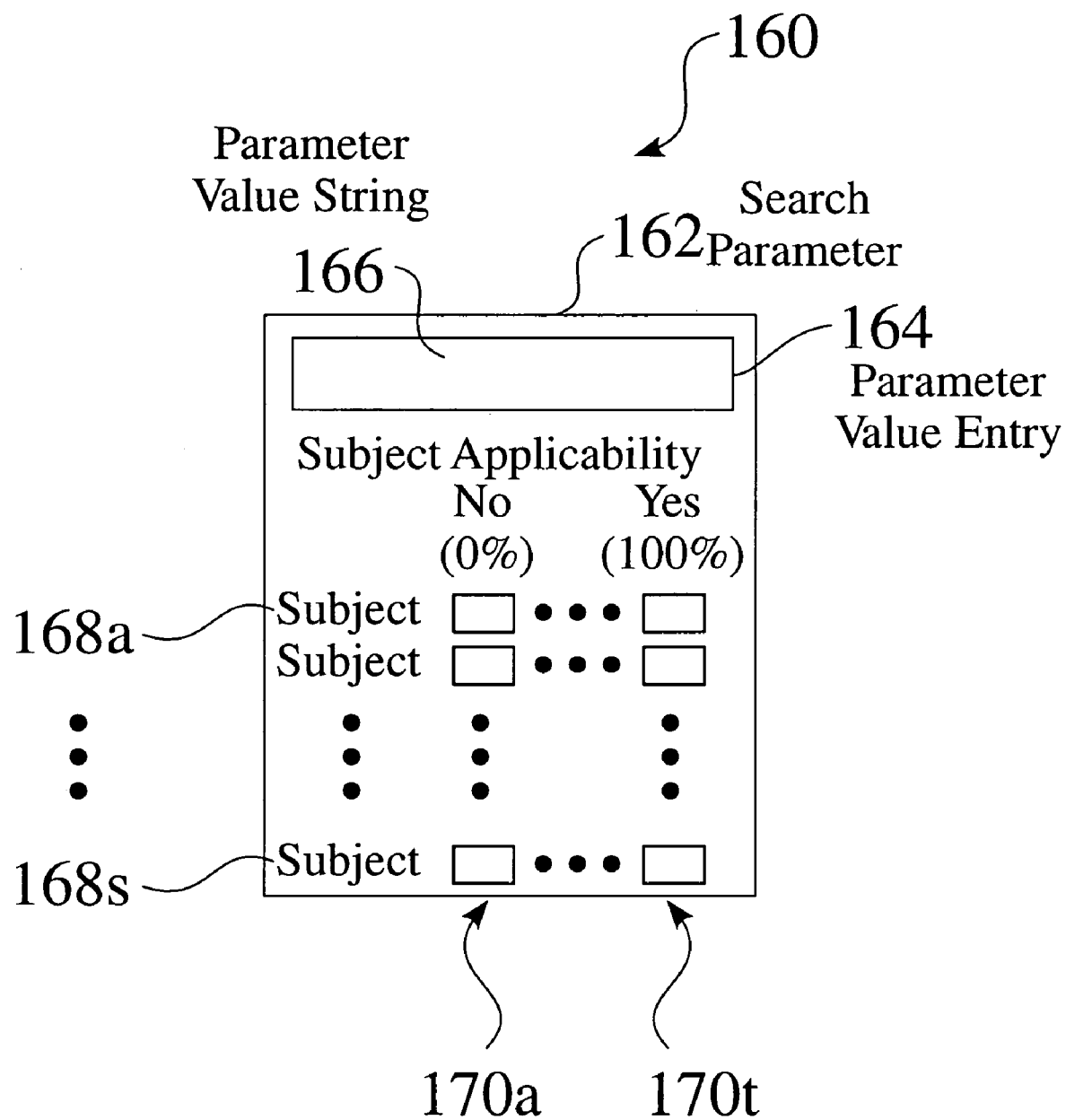
FIG. 13 is a schematic diagram of an enhanced search parameter and subject validities.

FIG. 13 is a schematic diagram 160 of an user-specified search parameter 148 and subject validities, i.e. rankings 170. A search parameter 148 typically comprises a parameter value 166 entered by a user USR, such as within a parameter value entry window 164 within a user interface 142 (FIG. 12).

A search parameter 148 may also preferably comprise an entered or determined ranking 170 for one or more subjects 168, e.g. 168a–168s, such that an applicability or validity of the parameter 148 can be explicitly or implicitly determined, i.e. such as in a determination of inclusion within a an enhanced search 24, or within search result refinement 22a and or sorting 22b. The search parameter 148 shown in FIG. 13 comprises applicability rankings 170, e.g. 170a–170t for at least one subject matter 168. An exemplary quantized ranking 170 may be ranked as Yes or No, one or more divisions between 0% to 100%, a numeric value of 1 to 5, or another rating value scale 170. A ranking 170 is preferably associated with each of the generalized search parameters 148 for a particular subject matter 168, so that results satisfying several of the criteria may be appropriately sorted.

Based upon the determined subject matter 168 of a search query 13, a user specified parameter 148 having a rankings 170 which is determined to be applicable to the search may either be used in conjunction with primary search terms, i.e. to further limit search results, or may be used to sort the results of a query based upon primary search criteria, wherein the sort is based upon the applicability ranking 170 of one or more generalized search parameters 148.

Figure 14:
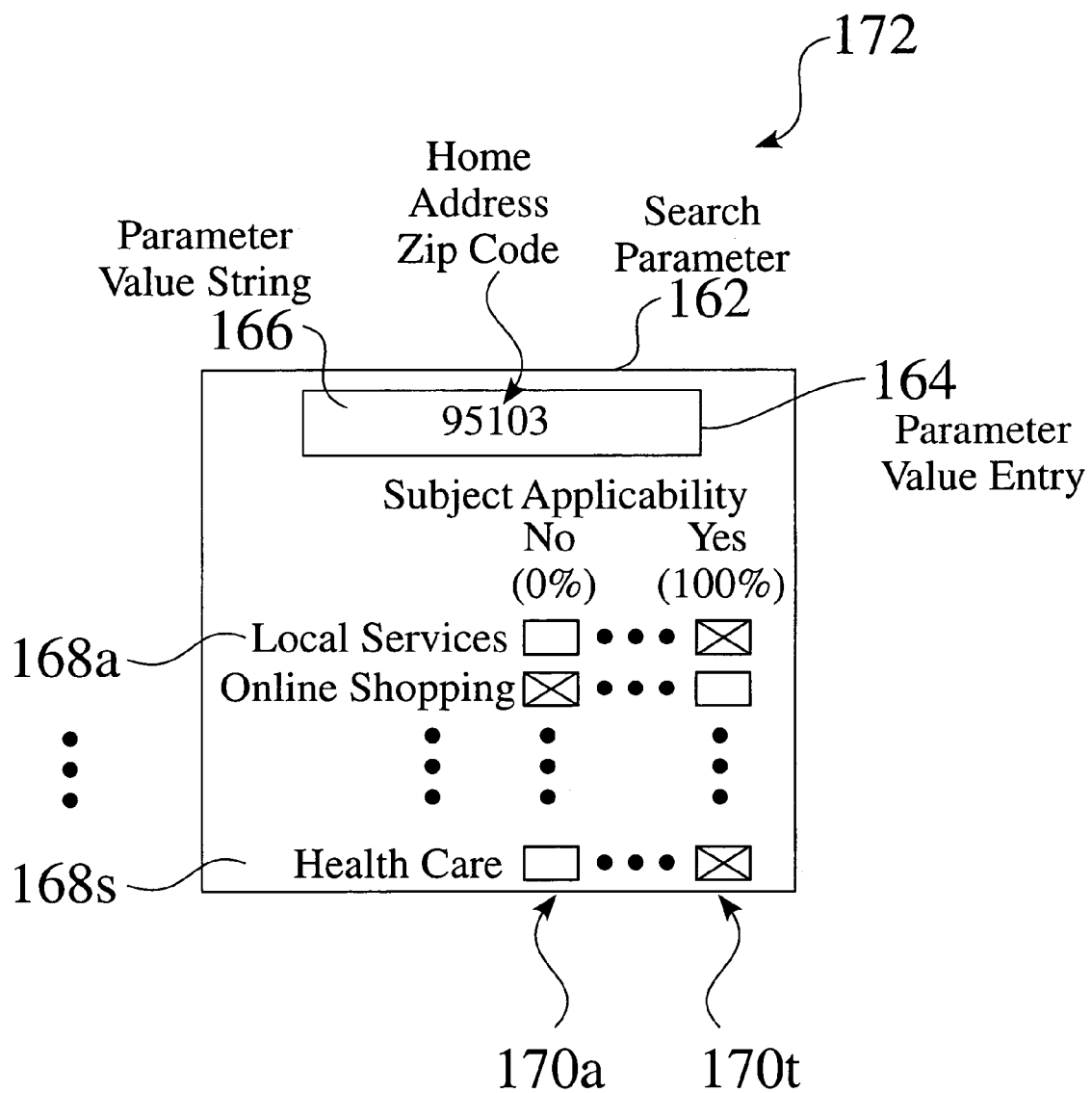
FIG. 14 is a detailed schematic diagram of an exemplary enhanced search parameter and subject validities.

FIG. 14 is a detailed schematic diagram 172 of an exemplary enhanced search parameter 148, having a parameter value 166 of "95103" for a home address zip code, along with subject validities, i.e. rankings 170 for a plurality of subjects 168, such as local services 168a, online shopping 168b, and health care 168s. As seen in FIG. 14, a ranking 170t of 100 percent applicability is associated with local services 168a, such that a search for a local service may preferably include the home address parameter 166 of the user USR.

To enable automatic association of appropriate parameters with future particularized searches, generalized user-specified search terms are preferably stored or associated with a label or type. In the example above, for instance, search terms may be stored as follows:

Health Insurance Carrier: Kaiser
User's Home Address: Street Address City, State, Zip
User's Work Address: Street Address City, State, Zip Thereafter, at the time of a particularized search by the user USR, the subject matter of the search 24 is identified or through explicit entry by the user USR, the relevant types of generalized search parameters 148 are identified based on the subject matter 124 of the search 24. Again using the example above, if the system 10 determines that a user USR seeks to search for a medical care provider, the generalized search parameters 148 of location and medical insurance provider may preferably be identified as relevant to this particularized search 24. Where available, user-specified information 18 related to those parameters are extracted from the general search parameters 148 associated with the user USR. Parameters 148 that are determined to be relevant can be used in any of a variety of ways, such as to return 22a or organize 22b better search results, or to perform a search 24 using the available subset of optimal parameters 148.

In some system embodiments, the system 10 solicits the user USR to provide any missing parameters at the time of the particularized search. For example, if the user-specified parameters do not include the insurance carrier of a user USR, a exemplary search for a medical care provider may be performed by supplementing the user's input with location alone, or the user USR may be asked for their medical insurance provider at the time of the particularized search.

Figure 15:
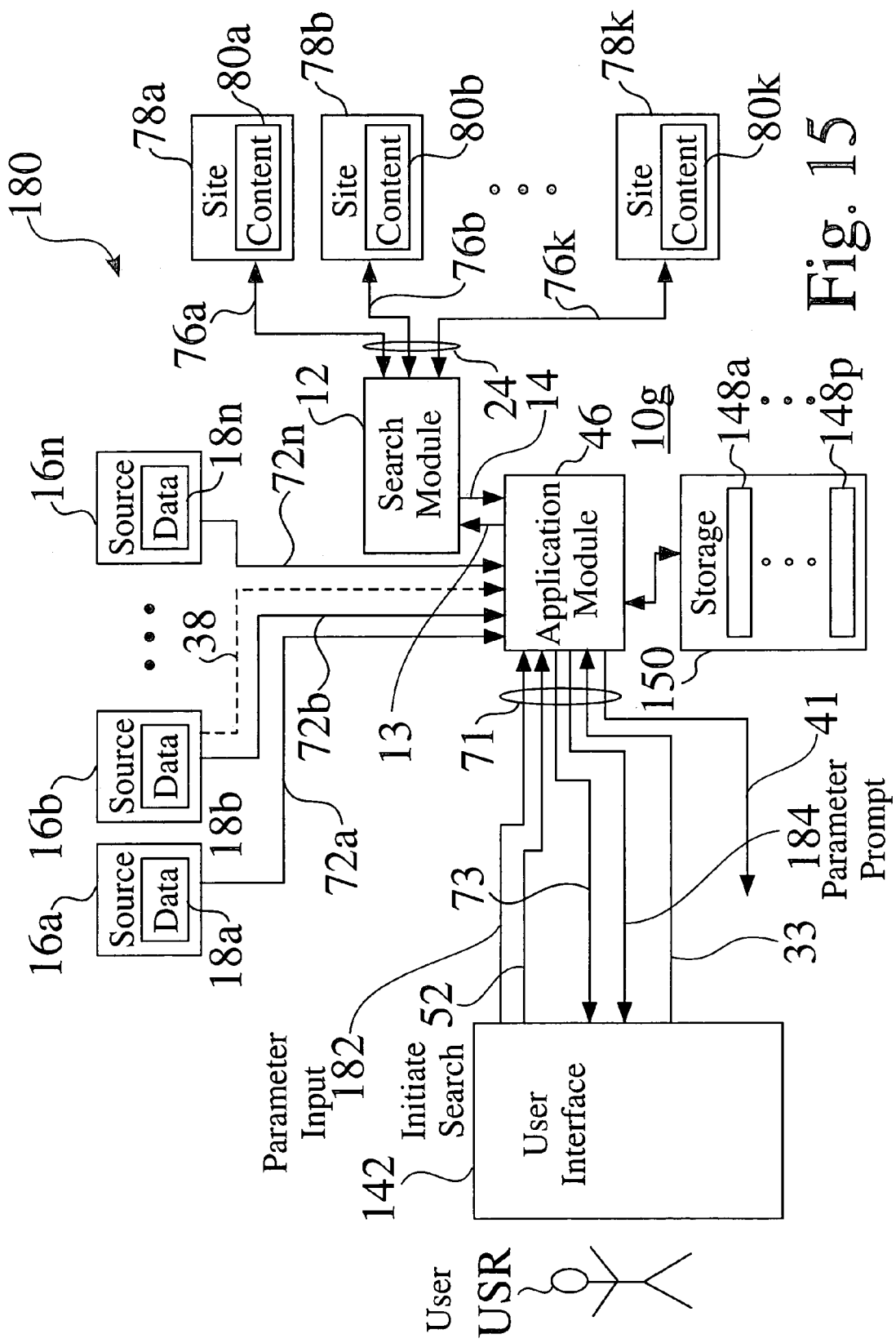
FIG. 15 is a functional block diagram of an enhanced search system comprising personal search parameters.
Figure 16:
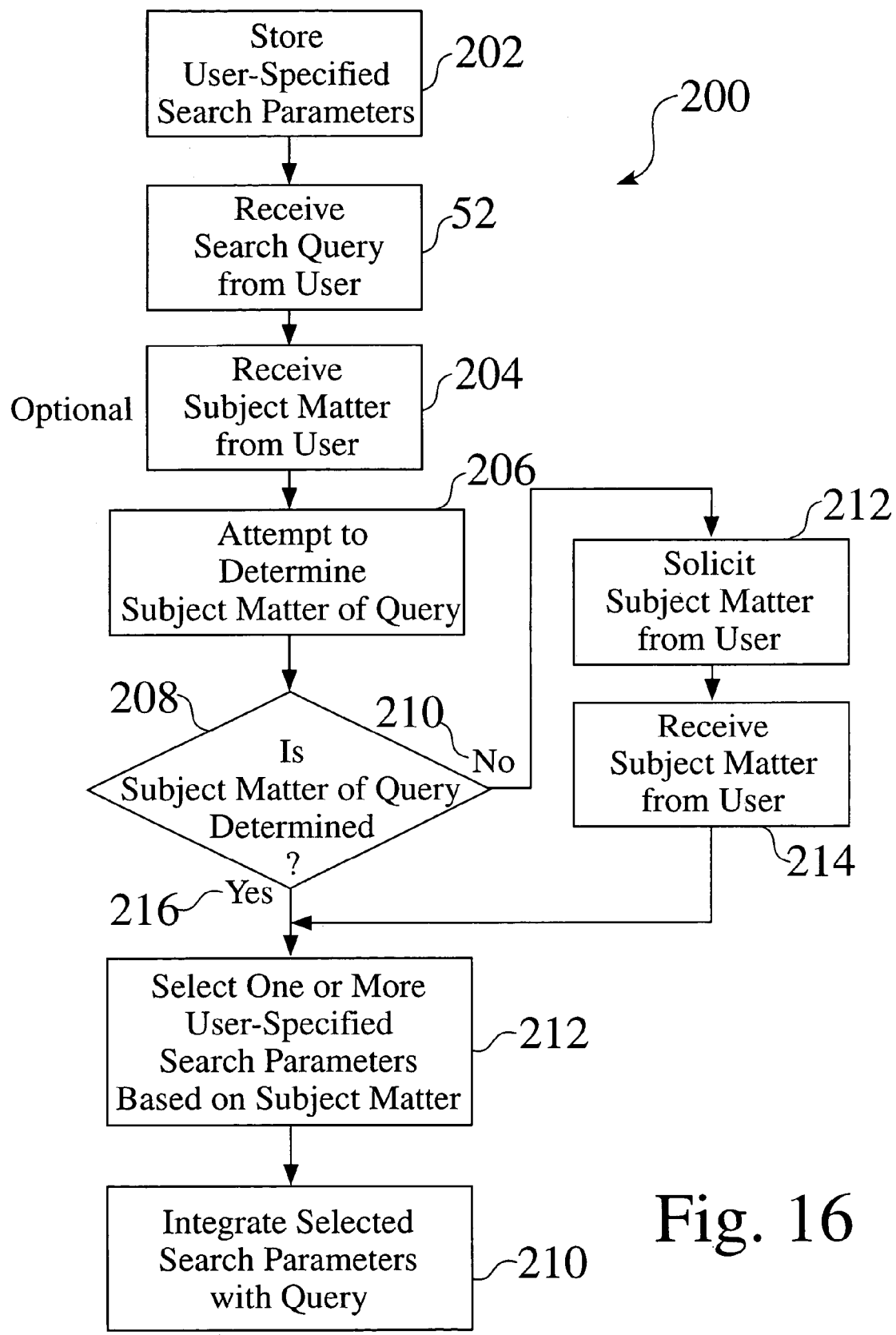
FIG. 16 is a flow chart of an enhanced search process comprising personal search parameters.

FIG. 15 is a functional block diagram of an enhanced search system 10g comprising personal search parameters 148. FIG. 16 is a flowchart showing an exemplary process 200 for an enhanced search system 10g, comprising personal search parameters 148, and the refinement 22 of search results 14 based upon one or more personal search parameters 148 which are determined to be relevant to the search.

As seen in FIG. 15, a user USR interacts 71 with an application module 46, typically between a user interface 142 at a user terminal 32 and the application module 46. Typical interactions 71 between a user terminal 32 and the application module 46 comprise input and definition 182 of parameters 148, search initiation 52, the return of standard, i.e. non-enhanced, search results 73, parameter prompts 184, source identification inputs 33, and/or the return 41a,41b of enhanced results 40.

Some embodiments of the enhanced search system 10, such as the enhanced search system 10g shown in FIG. 15, preferably provide user selected editorial searches, e.g. such as editorially ranked content, i.e. editorial commentary, corresponding to user input, which can then be returned 40a to the user USR, or sent 40b to recipients RCP, such as to send to selected peer recipients RCP of the user USR. In some system embodiments, the recipients RCP comprise one or members of a network of people associated with a user USR, e.g. such as node recipients RCP in a network of people with similar interests, or a chain of friends, e.g. such as established through the Internet, e.g. friendster.com.

The enhanced search system 10g shown in FIG. 15 may alternately provide enhanced results 40 which are filtered in part, i.e. refined 22a and/or organized 22b, based upon information 18 received from an external source 16, such as from the most popular people and/or places in the user's personal network.

The enhanced search system log and an associated method 200 therefore provide an enhancement to a search system, in which general search parameters are solicited from a user USR, either before or after a particularized search, such as through button selection within a user interface 142. In some system embodiments, the solicited search parameters are preferably associated with user selectable editorial content, such as for delivery to the user USR and/or to other recipients RCP, and are available for automatic integration into future particularized searches, such as initiated by the user USR or by other recipients RCP that are associated with the user USR, such as a network of friends, family, peers, students, neighbors, people or entities with a zip code region, and/or business associates.

In the exemplary process 200 shown in FIG. 16, a user USR is preferably able to initially store 202 user-specified search parameters 148. When a user USR initiates a search query process 52, an identification of the subject matter may also be identified 204, such as through explicit entry, e.g. through subject selection 125 (FIG. 10), or through an implicit determination 206 at the application module 46, e.g. based upon the entered search parameters 108 and parameter string 106. If the subject matter of the query is not 210 determined, the application module 46 solicits 212 and receives 214 the subject matter from the user USR. If the subject matter of the query is 216 determined, the system 10 selects 212 one or more user-specified search parameters 148 based on the subject matter, either for refinement 22a, sorting 22b of search results 14, or for integration 210 of the selected user-specified search parameters 148 with a query 13.

Upon receipt 33 of source identification from a user USR, the application module 46 typically sends a data query 36 to any identified sources 16, if the available data 18 from an identified source 16 is not yet available. Upon a data query 36, the data 18 is sent from an identified source 16, either to be included in a search query 13, or to be used in the processing 22 of search results 14. The application module 46 produces 22 the enhanced results 40, which are then sent 41, such as by returning 41a the enhanced results 40 to the user terminal 32, and/or by sending 41b the enhanced results 40 to one or more recipients RCP.

The enhanced search system 10g seen in FIG. 15 provides storage of a set of user-specified search parameters, and automatically integrates selected ones of the stored search parameters into a search query 13, based on the subject matter of that query 13. The subject matter of the query may be explicitly indicated by the user USR, or may be inferentially determined, based on user input.

In some embodiments of the enhanced search system 10g, general search parameters are typically solicited 184 from a user USR before a particularized search 13 is initiated. The solicited search parameters 148 are associated with the user USR, whereby the parameters 148 are available for automatic integration into future particularized searches initiated by the user USR.

The storage 150 of personal parameters may be located at a wide variety of locations within the system 10g, such as within a file stored on the user's computer 132 (FIG. 6). The general search parameters 148 may also be associated with a user's roaming profile, passport, or init packet, such that the system 10g may readily access personal parameters 148 for an identified user USR.

The determination and maintenance of generalized search parameters 148 can be provided by a wide variety of entities, such as but not limited to the application module 46, an independent enhancement module that works in conjunction with a conventional search engine 12 or as an application, utility, or application plug-in within a user terminal 32.

The enhanced system 10g is readily adapted to a wide variety of network structures, such as within an integrated search engine structure 44 (FIG. 6), or within an application module 46 which is retrofit to an existing, i.e. conventional, search engine 12. As well, the appropriate subject matter of a particularized search can be identified either at the application module 46, or even at a user terminal 32, e.g. such as for local storage or parameters 148 and refinement 22a and/or sorting 22b of search results 14.

In some system embodiments 10g, the user-specified search parameters are integrated into a search string and are therefore used to produce the number of resulting hits. In alternate embodiments of the enhanced search system 10g, user-specified parameters 148 are applied to the results of a search that is performed without their integration, such as within a system 10g which is retrofit to an existing search engine 12.

In some enhanced search system embodiments 10, at the time of a particularized search, an interface is presented to the user USR, which allows a customized search query, and enables the user USR to modify out-dated or unwanted search parameters.

Conventional search engines 12 typically operate in an objective manner, based upon search parameters 108 within a parameter string 106 input at the time of a search. As well, the search results of a conventional search engine are often sorted as a function of commercial or popular parameters.

The enhanced search system 10g and personal search parameters 148 allow the results of a search engine 12 to be enhanced 22, such as through refinement 22a and/or sorting 22b, to reflect the desired or intended focus of the user USR. Furthermore, the determined subject matter of the search allows the enhanced results 40 to reflect more subjective results than are provided in an objective search engine alone.

Although the enhanced search system and methods of use are described herein in connection with a user terminal, the apparatus and techniques can be implemented for a wide variety of electronic devices and systems, such as personal computers, mobile devices, and other microprocessor-based devices, such as portable digital assistants or network enabled cell phones, or any combination thereof, as desired.

As well, while the enhanced search system and methods of use are described herein in connection with interaction between a user terminal and an application module and search engine across a network such as the Internet, the enhanced search system and methods of use can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A process, comprising the steps of:
    soliciting from a user a set of one or more general search parameters specified by the user;
    soliciting from the user at least one ranking explicitly specified by the user, the rankings based on any of applicability and validity of at least one of the solicited general search parameters in regard to at least one subject matter;
    associatively storing the set of solicited general search parameters and the rankings specified by the user for at least one future search initiated by the user;
    receiving a search query from the user, the search query comprising one or more query parameters other than the previously solicited general search parameters;
    determining the subject matter of the received search query;
    selecting one or more of the associatively stored solicited general search parameters based upon any of applicability and validity of the associatively stored solicited search parameters with the determined subject matter of the received search query, wherein the selection is at least partially based on at least one of the rankings explicitly specified by the user; and
    providing a refined search, wherein the refinement comprises any of
        using the selected ones of the associatively stored solicited general search parameters in conjunction with the received query parameters to perform the search;
        performing the search with the received query parameters and subsequently refining search results with the selected ones of the associatively stored solicited general search parameters; and
        performing the search with the received query parameters and subsequently providing any of organizing and sorting of the search results with the selected ones of the associatively stored solicited general search parameters.

2. The process of claim 1, further comprising the step of: returning results of the refined search to the user.

3. The process of claim 1, further comprising the step of: sending results of the refined search to a recipient.

4. The process of claim 3, wherein the recipient is selected by the user.

5. The process of claim 3, wherein the recipient is determined based on the results of the refined search.

6. The process of claim 3, wherein the recipient is determined based on information input by the user.

7. The process of claim 1, further comprising the steps of:
receiving information from a recipient; and
selectively sending results of the refined search to the recipient based upon any of the received information from the recipient and a selection of the recipient by the user.

8. The process of claim 7, wherein the received information comprises an interest in the results of the refined search by the recipient.

9. The process of claim 1, wherein the subject matter is explicitly indicated by the user.

10. The process of claim 1, wherein the subject matter is inferentially determined based upon user input.

11. The process of claim 1, wherein the user-specified search parameters comprise a selectable applicability based upon subject matter, further comprising the step of:
determining the selected ones of the associatively stored solicited search parameters based upon the selectable applicability.

12. The process of claim 3, wherein the recipient is any of a selected peer, a friend, a family relative, a student, a neighbor, any of a person or entity within a zip code region, and a member of a network of people associated with the user.

13. The process of claim 12, wherein the network of people comprises any of people with similar interests and a chain of friends.

14. The process of claim 1, further comprising the steps of:
soliciting the user to provide at least one parameter after receipt of the query at the time of the search.

15. The process of claim 14, wherein the solicited parameter is a missing parameter.

16. The process of claim 1, further comprising the steps of:
receiving at least one source selection from the user; and
modifying the search query based upon information from the selected source.

17. The process of claim 1, wherein the step of soliciting the general search parameters from the user occurs any of before and after a particularized search.

18. A process, comprising the steps of:
soliciting from a user at least one user-specified search parameter;
soliciting from the user at least one ranking explicitly specified by the user, the rankings based on any applicability and validity of at least one of the solicited user-specified search parameters in regard to at least one subject matter;
associating the solicited user-specified search parameters and the explicitly specified rankings with the user;
storing the associated solicited user-specified search parameters and the explicitly specified rankings for use in at least one future search initiated by the user;
receiving a search query from the user, the search query comprising one or more query parameters other than the previously solicited user-specified search parameters;
determining the subject matter of the received search query;
selecting one or more of the stored associated solicited user-specified search parameters based on any of applicability and validity of the stored associated solicited user-specified search parameters with the determined subject matter of the received search query, wherein the selection is at least partially based on at least one of the solicited user-specified search parameters having a ranking explicitly specified by the user; and
providing a refined search, wherein the refinement comprises any of
using the selected ones of the stored associated solicited user-specified search parameters in conjunction with the received query parameters to perform the search;
performing the search with the received query parameters and subsequently refining search results with the selected ones of the stored associated solicited user-specified search parameters; and
performing the search with the received query parameters and subsequently providing any of organizing and sorting of the search results with the selected ones of the stored associated solicited user-specified search parameters.

19. The process of claim 18, further comprising the step of:
returning results of the refined search to the user.

20. The process of claim 18, further comprising the step of:
sending results of the refined search to a recipient.

21. The process of claim 20, wherein the recipient is selected by the user.

22. The process of claim 20, wherein the recipient is determined based on the results of the refined search.

23. The process of claim 20, wherein the recipient is determined based on information input by the user.

24. The process of claim 18, further comprising the steps of:
receiving information from a recipient; and
selectively sending results of the refined search to the recipient based upon any of the received information from the recipient and a selection of the recipient by the user.

25. The process of claim 24, wherein the received information comprises an interest in the results of the refined search by the recipient.

26. The process of claim 18, wherein the subject matter is explicitly indicated by the user.

27. The process of claim 18, wherein the subject matter is inferentially determined based upon user input.

28. The process of claim 18, wherein the user-specified search parameters comprise a selectable applicability based upon subject matter, and further comprising the step of:
determining the selected ones of the stored associated solicited user-specified search parameters based upon the selectable applicability.

29. The process of claim 20, wherein the recipient is any of a selected peer, a friend, a family relative, a student, a neighbor, any of a person or entity within a zip code region, and a member of a network of people associated with the user.

30. The process of claim 29, wherein the network of people comprises any of people with similar interests and a chain of friends.

31. The process of claim 18, further comprising the steps of:
soliciting the user to provide at least one parameter after receipt of the query at the time of the search.

32. The process of claim 31, wherein the solicited parameter is a missing parameter.

33. The process of claim 18, further comprising the steps of:
receiving at least one source selection from the user; and modifying the search query based upon information from the selected source.

34. The process of claim 18, wherein the step of soliciting the user-specified search parameters from the user occurs any of before and after a particularized search.

35. A system, comprising:
means for soliciting from a user at least one user-specified search parameter;
means for soliciting from the user one or more rankings ranking explicitly specified by the user, the rankings based on any of applicability and validity of at least one of the solicited user-specified search parameters in regard to at least one subject matter;
means for associating the solicited user-specified search parameters and the explicitly specified rankings with the user;
means for storing the associated solicited user-specified search parameters and the explicitly specified rankings for use in at least one future search initiated by the user;
means for receiving an initial search query from the user, the search query comprising one or more query parameters other than the previously solicited user-specified search parameters;
means for determining the subject matter of the received initial search query;
means for selection of one or more of the stored associated solicited user-specified search parameters based on any of applicability and validity of the stored associated solicited search parameters with the determined subject matter of the received search query, wherein the selection is at least partially based on at least one of the solicited user-specified search parameters having a ranking explicitly specified by the user; and
means for providing a refined search, wherein the refinement comprises any of
means for using the selected ones of the stored associated solicited user-specified search parameters in conjunction with the received query parameters to perform the search;
means for performing the search with the received query parameters and subsequently refining search results with the selected ones of the stored associated solicited user-specified search parameters; and
means for performing the search with the received query parameters and subsequently providing any of organizing and sorting of the search results with the selected ones of the stored associated solicited user-specified search parameters.

36. The system of claim 35, wherein results of the refined search are sent to the user.

37. The system of claim 35, wherein results of the refined search are sent to a recipient.

38. The system of claim 37, wherein the recipient is selectable by the user.

39. The system of claim 37, wherein the recipient is based on the results of the refined search.

40. The system of claim 37, wherein the recipient is based on information input by the user.

41. The system of claim 35, further comprising:
information received from a recipient; and
a selective transmission of the results of the refined search to the recipient based upon any of the received information and a selection of the recipient by the user.

42. The system of claim 29, wherein the received information comprises an interest in the results of the refined search.

43. The system of claim 35, wherein the determination of the subject matter is explicitly indicated by the user.

44. The system of claim 35, wherein the determination of the subject matter is inferentially determined based upon user input.

45. The system or claim 35, wherein the stored associated solicited user-specified search parameters comprise a selectable applicability based upon subject matter, and wherein the means for selection is based upon the selectable applicability.

46. The system of claim 37, wherein the recipient is any of a selected peer, a friend, a family relative, a student, a neighbor, any of a person or entity within a zip code region, and a member of a network of people associated with the user.

47. The system of claim 46, wherein the network of people comprises any of people with similar interests and a chain of friends.

48. The system of claim 35, further comprising:
means for soliciting the user to provide at least one additional parameter after receipt of the query at the time of the search.

49. The system of claim 48, wherein the solicited additional parameter is a missing parameter.

50. The system of claim 35, further comprising:
means for receiving at least one source selection from the user; and
means for modifying the search query based upon information from the selected source.

51. The system of claim 35, wherein the means for soliciting the user-specified search parameters corresponds to any of before and after a particularized search.

* * * * *

UNITED STATES PATENT AND TRADEMARK OFFICE
CERTIFICATE OF CORRECTION

PATENT NO. : 7,165,119 B2  Page 1 of 1
APPLICATION NO. : 10/685749
DATED : January 16, 2007
INVENTOR(S) : Fish It is certified that error appears in the above-identified patent and that said Letters Patent is hereby corrected as shown below:

Front Page, Item [75] Inventor, replace, "Edmund J. Fish"

with:  --Edmund J. Fish, Dulles, VA (US)
       Bradley Chase Harrison, New York, NY (US)--

Signed and Sealed this

Fifteenth Day of May, 2007

JON W. DUDAS
*Director of the United States Patent and Trademark Office*